(12) United States Patent
Hong et al.

(10) Patent No.: US 12,501,159 B2
(45) Date of Patent: Dec. 16, 2025

(54) ACTUATOR FOR OPTICAL IMAGE STABILIZATION AND CAMERA MODULE INCLUDING ACTUATOR FOR OPTICAL IMAGE STABILIZATION

(71) Applicant: Samsung Electro-Mechanics Co., Ltd., Suwon-si (KR)

(72) Inventors: Jong Woo Hong, Suwon-si (KR); Kyung Hun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 153 days.

(21) Appl. No.: 18/212,956

(22) Filed: Jun. 22, 2023

(65) Prior Publication Data

US 2024/0214679 A1    Jun. 27, 2024

(30) Foreign Application Priority Data

Dec. 23, 2022 (KR) ........................ 10-2022-0183468

(51) Int. Cl.
*H04N 23/68* (2023.01)
*H04N 23/54* (2023.01)

(52) U.S. Cl.
CPC ........... *H04N 23/685* (2023.01); *H04N 23/54* (2023.01)

(58) Field of Classification Search
CPC ...... H04N 23/685; H04N 23/54; H04N 23/00; H04N 23/55; H04N 23/57; H04N 23/687; G03B 17/12; G03B 2205/0069; H02K 41/0356

See application file for complete search history.

(56) References Cited

U.S. PATENT DOCUMENTS

| | | | |
|---|---|---|---|
| 11,122,205 B1 | 9/2021 | Sharma | |
| 2015/0049209 A1* | 2/2015 | Hwang | G02B 7/09 348/208.11 |
| 2016/0241787 A1* | 8/2016 | Sekimoto | G02B 7/09 |

(Continued)

FOREIGN PATENT DOCUMENTS

| | | |
|---|---|---|
| KR | 10-2021-0117124 A | 9/2021 |
| KR | 10-2022-0083546 A | 6/2022 |
| KR | 10-2022-0149424 A | 11/2022 |

OTHER PUBLICATIONS

Korean Office Action issued on Sep. 19, 2024, in counterpart Korean Patent Application No. 10-2022-0183468 (9 pages in English, 7 pages in Korean).

*Primary Examiner* — Padma Haliyur

(74) *Attorney, Agent, or Firm* — NSIP Law

(57) ABSTRACT

An actuator for optical image stabilization includes a fixed frame having an internal space, a movable frame disposed in the fixed frame and configured to be movable relative to the fixed frame, a first driving unit configured to apply a driving force to the movable frame, and a sensor substrate including a moving portion coupled to the movable frame, wherein an image sensor is disposed on the sensor substrate, the first driving unit includes a first sub-driving unit including a first magnet disposed on the fixed frame and a first coil disposed to face the first magnet, and a second sub-driving unit including a second magnet disposed on the fixed frame and a second coil disposed to face the second magnet, and a portion of the first magnet overlaps a portion of the second magnet in a direction perpendicular to an imaging surface of the image sensor.

20 Claims, 12 Drawing Sheets

(56) References Cited

U.S. PATENT DOCUMENTS

| | | | |
|---|---|---|---|
| 2020/0336639 A1* | 10/2020 | Hu | G03B 17/55 |
| 2021/0048563 A1* | 2/2021 | Kim | G02B 3/14 |
| 2021/0173223 A1* | 6/2021 | Seo | G02B 7/09 |
| 2021/0294184 A1 | 9/2021 | Kim et al. | |
| 2021/0302690 A1* | 9/2021 | Lin | G02B 7/09 |
| 2021/0318592 A1 | 10/2021 | Kim et al. | |
| 2022/0014677 A1* | 1/2022 | Smyth | G02B 7/09 |
| 2022/0187616 A1 | 6/2022 | Lee | |
| 2022/0353416 A1* | 11/2022 | Kwon | H04N 23/687 |
| 2023/0229058 A1* | 7/2023 | Hwang | H04N 23/55 |
| | | | 359/557 |
| 2024/0244746 A1* | 7/2024 | Son | G02B 7/08 |

\* cited by examiner

VIII-VIII'

XIV–XIV'

ACTUATOR FOR OPTICAL IMAGE STABILIZATION AND CAMERA MODULE INCLUDING ACTUATOR FOR OPTICAL IMAGE STABILIZATION

CROSS-REFERENCE TO RELATED APPLICATIONS

This application claims the benefit under 35 USC 119(a) of Korean Patent Application No. 10-2022-0183468 filed on Dec. 23, 2022, in the Korean Intellectual Property Office, the entire disclosure of which is incorporated herein by reference for all purposes.

BACKGROUND

1. Field

The present disclosure relates to an actuator for optical image stabilization and a camera module including an actuator for optical image stabilization.

2. Description of Related Art

Recently, camera modules have been adopted in mobile communication terminals, such as smartphones, tablet PCs, and laptop computers.

In addition, camera modules are equipped with an actuator having a focus adjustment function (or an autofocusing function) and an optical image stabilization function in order to generate high-resolution images.

For example, focus is adjusted by moving a lens module in an optical axis direction, or shaking is corrected by moving the lens module in a direction perpendicular to the optical axis.

However, as the performance of camera modules has recently improved, the weight of the lens module has also increased and the weight of a driving unit for moving the lens module is also affected, making it difficult to precisely control a driving force for optical image stabilization.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an actuator for optical image stabilization includes a fixed frame having an internal space; a movable frame disposed in the internal space of the fixed frame and configured to be movable relative to the fixed frame; a first driving unit configured to apply a driving force to the movable frame; and a sensor substrate including a moving portion coupled to the movable frame, wherein an image sensor is disposed on the moving portion of the sensor substrate, the first driving unit includes a first sub-driving unit including a first magnet disposed on the fixed frame and a first coil disposed to face the first magnet; and a second sub-driving unit including a second magnet disposed on the fixed frame and a second coil disposed to face the second magnet, and a portion of the first magnet overlaps a portion of the second magnet in a direction perpendicular to an imaging surface of the image sensor.

A direction in which the first magnet and the first coil face each other and a direction in which the second magnet and the second coil face each other may be perpendicular to each other.

The first magnet and the first coil may be configured to generate a driving force in a direction perpendicular to the direction in which the first magnet and the first coil face each other, and the second magnet and the second coil may be configured to generate a driving force in a direction perpendicular to the direction in which the second magnet and the second coil face each other.

The first magnet and the first coil may be disposed to face each other in the direction perpendicular to the imaging surface of the image sensor, and the second magnet and the second coil may be disposed to face each other in a direction parallel to the imaging surface of the image sensor.

The first magnet may include two magnets spaced apart from each other in a first axis direction parallel to the imaging surface of the image sensor, the first coil may include two coils spaced apart from each other in the first axis direction, the second magnet may include two magnets spaced apart from each other in the first axis direction, and the second coil may include two coils spaced apart from each other in the first axis direction.

The actuator may further include a wiring pattern portion disposed inside the movable frame, and the first coil and the second coil may be electrically connected to the sensor substrate by the wiring pattern portion.

The first coil and the second coil may be disposed on the movable frame, and the wiring pattern portion may include a first wiring pattern having one end electrically connected to the first coil and another end electrically connected to the sensor substrate; and a second wiring pattern having one end electrically connected to the second coil and another end electrically connected to the sensor substrate.

The actuator may further include a first ball assembly disposed between the fixed frame and the movable frame; a first yoke facing the first magnet and disposed inside the movable frame; and a second yoke facing the second magnet and disposed inside the movable frame.

The actuator may further include a support pad disposed inside the movable frame, and one surface of the support pad may exposed to the outside of the movable frame and may contact the first ball assembly.

In another general aspect, a camera module includes a housing having an internal space; a lens module disposed in the internal space of the housing and configured to be movable relative to the housing in an optical axis direction of the lens module; a fixed frame disposed in the internal space of the housing and fixed relative to the housing; a movable frame configured to be movable relative to the fixed frame in a direction perpendicular to the optical axis direction; a first ball assembly disposed between the fixed frame and the movable frame; a first driving unit including a first magnet and a second magnet disposed on the fixed frame, and a first coil and a second coil disposed on the movable frame; and a sensor substrate including a moving portion coupled to the movable frame, wherein an image sensor is disposed on the moving portion of the sensor substrate, the first magnet and the first coil are configured to generate a driving force in a first axis direction perpendicular to the optical axis direction, the second magnet and the second coil are configured to generate a driving force in a second axis direction perpendicular to both the optical axis direction and the first axis direction, and both the first magnet and the second magnet are elongated in the first axis direction or the second axis direction.

The first magnet and the first coil may be disposed to face each other in the optical axis direction, and the second magnet and the second coil may be disposed to face each other in the first axis direction.

The first magnet may include two magnets spaced apart from each other in the first axis direction, the first coil may include two coils spaced apart from each other in the first axis direction, the second magnet may include two magnets spaced apart from each other in the first axis direction, and the second coil may include two coils spaced apart from each other in the first axis direction.

The camera module may further include a wiring pattern portion disposed inside the movable frame, and the first coil and the second coil may be electrically connected to the sensor substrate by the wiring pattern portion.

The camera module may further include a second ball assembly disposed between the housing and the lens module, the second ball assembly may include a first ball group and a second ball group spaced apart from each other in the first axis direction, the first ball group may include two or more balls disposed in the optical axis direction, and the second ball group may include fewer balls than the first ball group.

The lens module may include a first guide portion protruding in the optical axis direction, the housing may include a second guide portion protruding in the optical axis direction and accommodating the first guide portion, and the camera module may further include a second ball assembly disposed between the first guide portion and the second guide portion.

The fixed frame may include a step portion providing an accommodation space in which the second guide portion is disposed.

In another general aspect, an actuator for optical image stabilization includes a fixed frame having an internal space; a movable frame disposed in the internal space of the fixed frame and configured to be movable relative to the fixed frame; a sensor substrate including a moving portion fixed to the movable frame, the moving portion including an image sensor mounting area; a first sub-driving unit configured to apply a first sub-driving force to the movable frame to move the movable frame in a first axis direction perpendicular to an optical axis direction perpendicular to a surface of the image sensor mounting area; and a second sub-driving unit configured to apply a second sub-driving force to the movable frame to move the movable frame in a second axis direction perpendicular to the first axis direction and the optical axis direction and maintain the second sub-driving force substantially constant as the movable frame moves in the first axis direction.

The first sub-driving unit may include two magnets supported by the fixed frame and spaced apart from each other in the first axis direction; and two coils supported by the movable frame, spaced apart from each other in the first axis direction, and respectively facing the two magnets of the first sub-driving unit in the optical axis direction, and the second sub-driving unit may include two magnets supported by the fixed frame and spaced apart from each other in the first axis direction; and two coils supported by the movable frame, spaced apart from each other in the first axis direction, and respectively facing the two magnets of the second sub-driving unit in the first axis direction.

The actuator may further include two support yokes mounted on the fixed frame and spaced apart from each other in the first axis direction, each of the two magnets of the first sub-driving unit may be mounted on a surface of a respective one of the two support yokes facing in the optical axis direction, and each of the two magnets of the second sub-driving unit may be mounted on a surface of a respective one of the two support yokes facing in the first axis direction.

A portion of each of the two magnets of the first sub-driving unit may overlap a portion of a respective one of the two magnets of the second sub-driving unit in the optical axis direction, and the two magnets of the first sub-driving unit and the two magnets of the second sub-driving unit may be elongated in the second axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
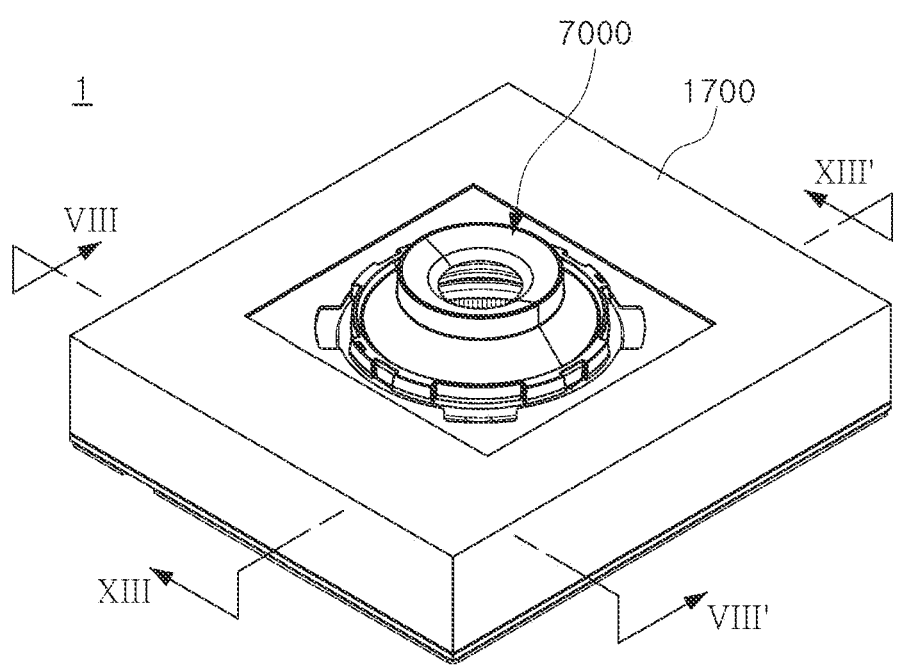
FIG. 1 is a perspective view of a camera module according to an embodiment in the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

A camera module including the an actuator for optical image stabilization according to an embodiment in the present disclosure may be installed in a portable electronic device. The portable electronic device may be, for example, a mobile communication terminal, a smartphone, or a tablet PC.

Figure 2:
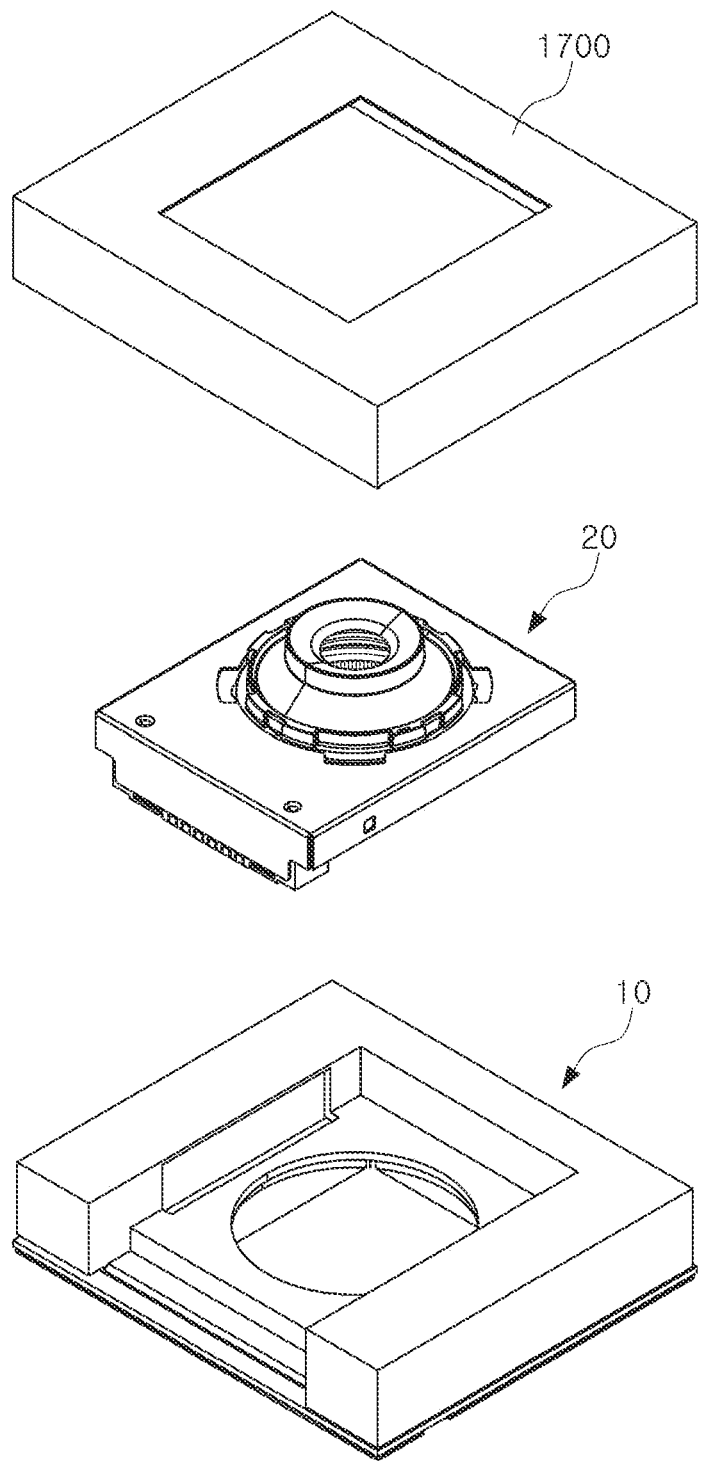
FIGS. 2 and 3 are schematic exploded perspective views of the camera module of FIG. 1.
Figure 3:
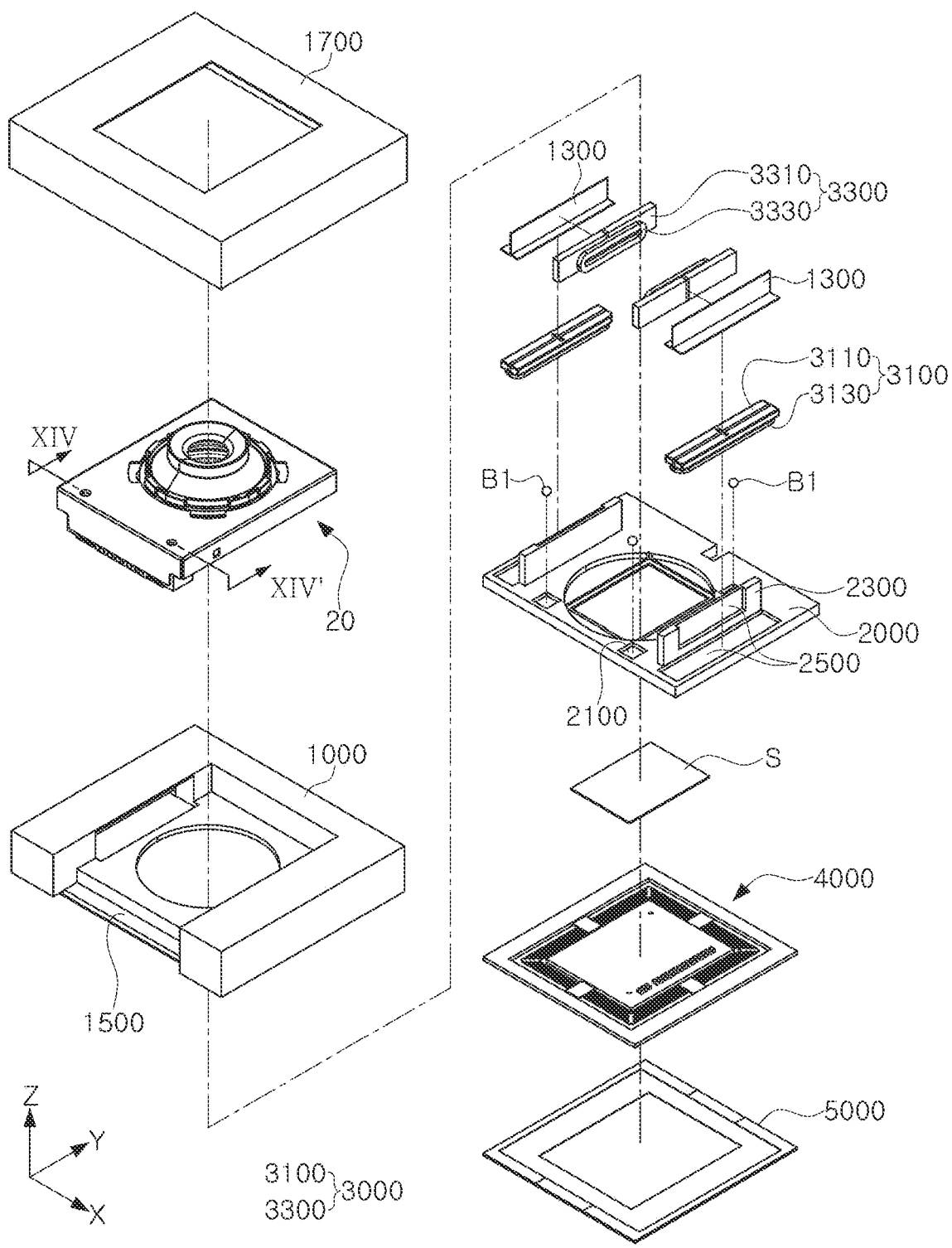

FIG. 1 is a perspective view of a camera module according to an embodiment in the present disclosure, and FIGS. 2 and 3 are schematic exploded perspective views of the camera module of FIG. 1.

Referring to FIGS. 1 to 3, a camera module 1 according to an embodiment in the present disclosure includes a lens module 7000, an image sensor S, a first actuator 10, and a second actuator 20.

The first actuator 10 is an actuator for optical image stabilization (OIS), and the second actuator 20 is an actuator for focus adjustment.

Figure 11:
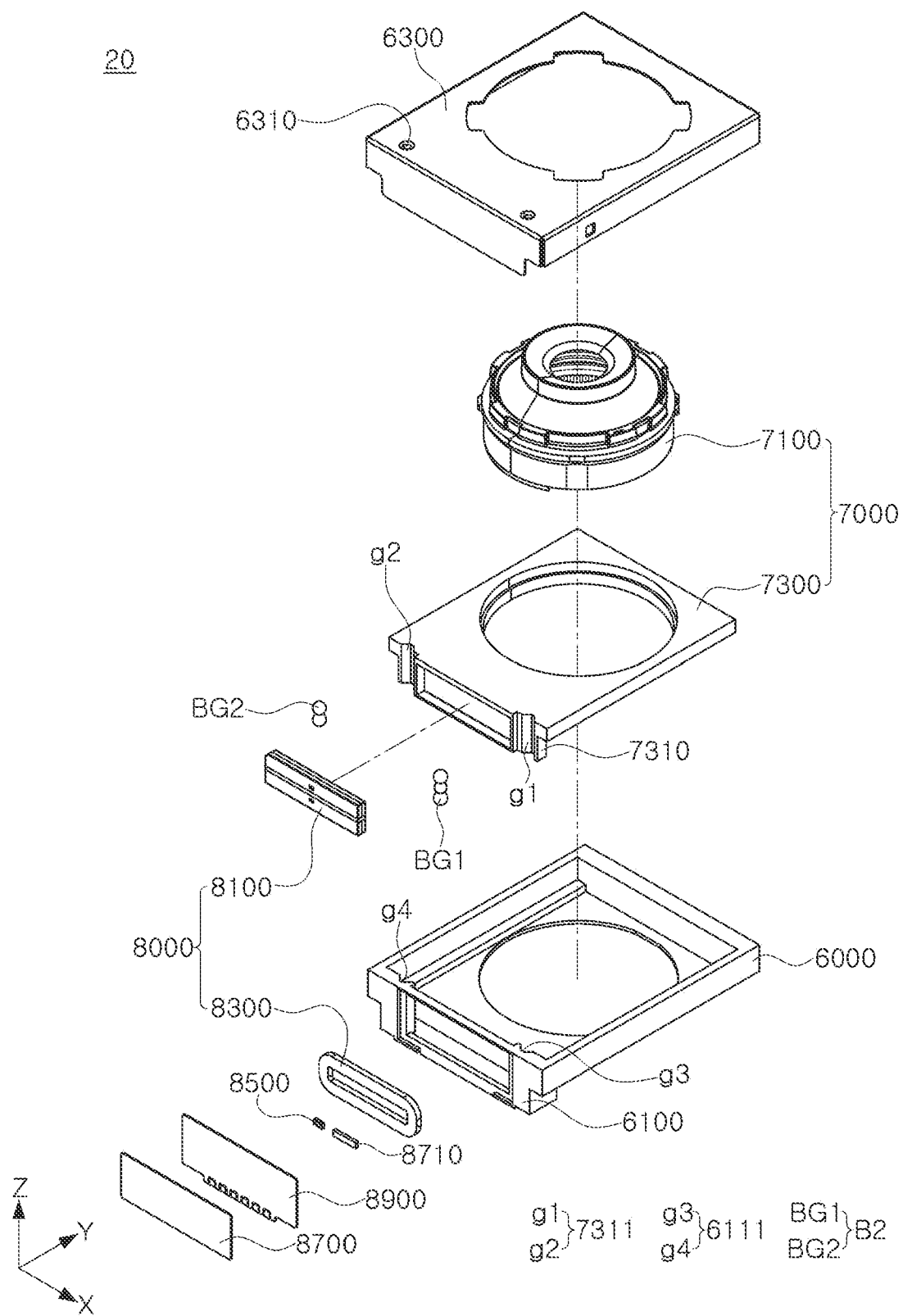
FIG. 11 is an exploded perspective view of a second actuator of the camera module of FIGS. 1 to 3.
Figure 13:
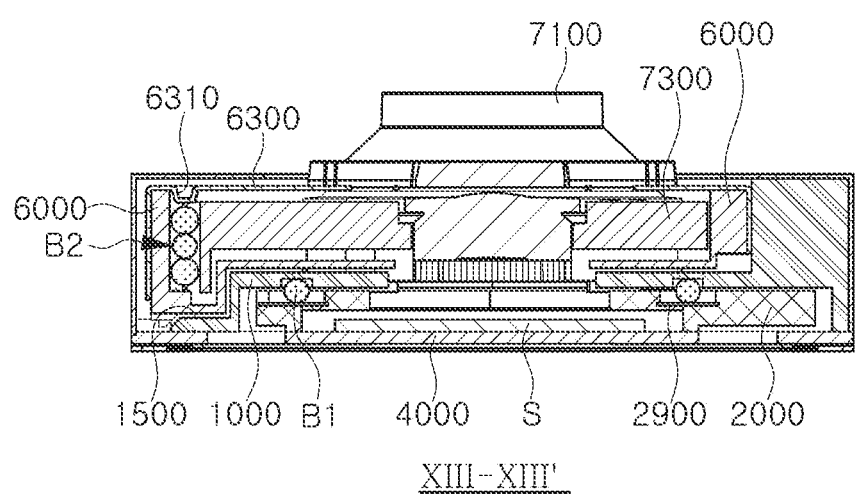
FIG. 13 is a cross-sectional view of the camera module of FIGS. 1 to 3 taken along the line XIII-XIII' of FIG. 1.
Figure 14:
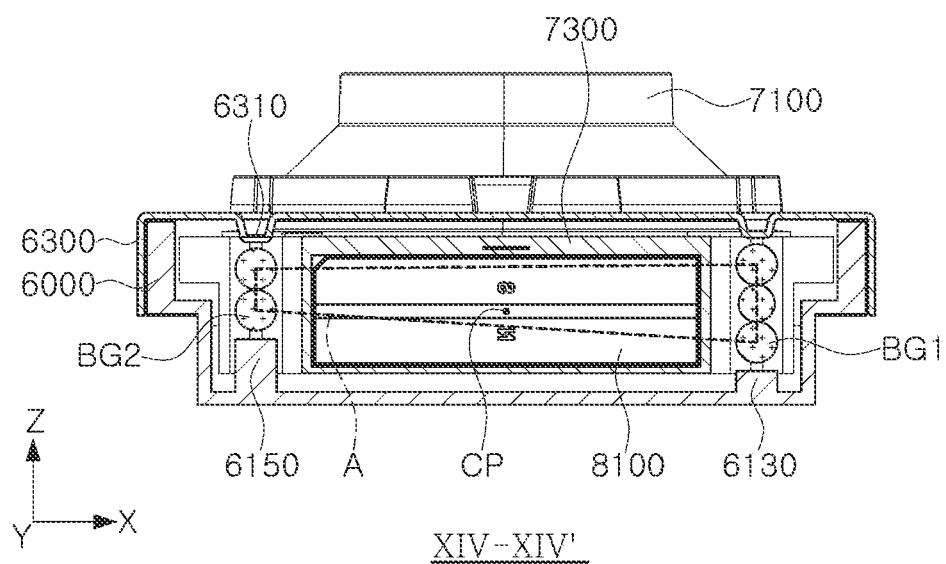
FIG. 14 is a cross-sectional view of the second actuator of FIG. 11 taken along the line XIV-XIV' of FIG. 3.

The lens module 7000 includes at least one lens and a lens barrel 7100 (see FIGS. 11, 13, and 14). The at least one lens is disposed inside the lens barrel 7100. When a plurality of lenses are provided, the plurality of lenses are mounted inside the lens barrel 7100 along an optical axis (a Z-axis).

The lens module 7000 may further include a carrier 7300 (see FIGS. 11, 13, and 14) coupled to the lens barrel 7100.

The carrier 7300 may include an opening penetrating through the carrier 7300 in the optical axis (the Z-axis) direction, and the lens barrel 7100 is inserted into the opening and fixedly disposed with respect to the carrier 7300.

The lens module 7000 is a moving member moving in the optical axis (the Z-axis) direction during autofocusing (AF). To this end, the camera module 1 includes the second actuator 20.

The lens module 7000 may be moved in the optical axis (the Z-axis) direction by the second actuator 20 to adjust the focus.

The lens module 7000 is a fixed member that does not move during OIS.

The camera module 1 may perform OIS by moving the image sensor S instead of the lens module 7000. Since the relatively light image sensor S is moved, the image sensor S may be moved with less driving force. Therefore, OIS may be performed more accurately.

To this end, the camera module 1 includes a first actuator 10.

The image sensor S may be moved in a direction perpendicular to the optical axis (the Z-axis) by the first actuator 10 or rotated about the optical axis (the Z-axis) as a rotation axis to compensate for shaking (i.e., to perform OIS).

That is, the image sensor S may be moved by the first actuator 10 in a direction perpendicular to a direction in which an imaging surface of the image sensor S faces. For example, the image sensor S may be moved in a direction perpendicular to the optical axis (the Z-axis) or rotated about the optical axis (the Z-axis) as a rotation axis to compensate for shaking.

In this specification, the direction in which the imaging surface of the image sensor S faces (or a direction perpendicular to the imaging surface of the image sensor S) may be referred to as the optical axis (the Z-axis) direction. That is, the image sensor S may move in a direction perpendicular to the optical axis (the Z-axis).

In the drawings of this specification, moving the image sensor S in a direction parallel to the imaging surface may be understood as moving the image sensor S in a direction perpendicular to the optical axis (the Z-axis).

In addition, moving the image sensor S in a first axis (an X-axis) direction or a second axis (a Y-axis) direction may be understood as moving the image sensor S in a direction perpendicular to the optical axis (the Z-axis direction).

In addition, although it is described that the image sensor S may be rotated around the optical axis (the Z-axis) as a rotation axis for convenience, when the image sensor S is rotated, a rotation axis thereof may not coincide with the optical axis (the Z-axis). For example, the image sensor S may be rotated around any axis parallel to the optical axis (the (X-axis) as a rotation axis.

In addition, the first axis (the X-axis) direction and the second axis (the Y-axis) direction are examples of two directions that are perpendicular to the optical axis (the Z-axis) and cross each other, and in this specification, the first axis (the X-axis) direction and the second axis (the Y-axis) direction may be understood as two directions that are perpendicular to the optical axis (the Z-axis) and cross each other.

Figure 4:
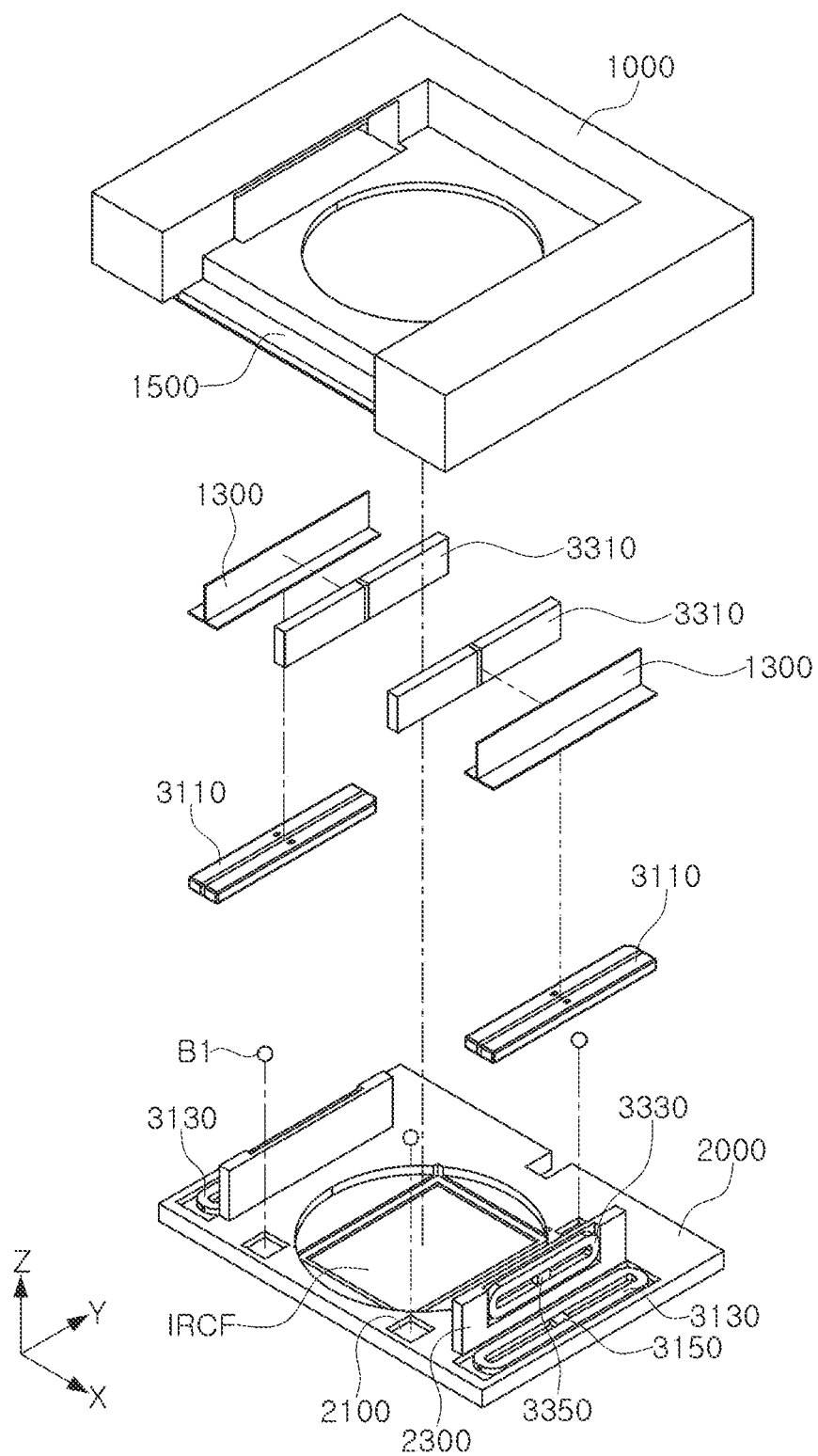
FIG. 4 is an exploded perspective view of a first actuator of the camera module of FIGS. 1 to 3.

FIG. 4 is an exploded perspective view of a first actuator the camera module of FIGS. 1 to 3, and FIG. 5 is a modified example of the first actuator of FIG. 4.

Figure 6:
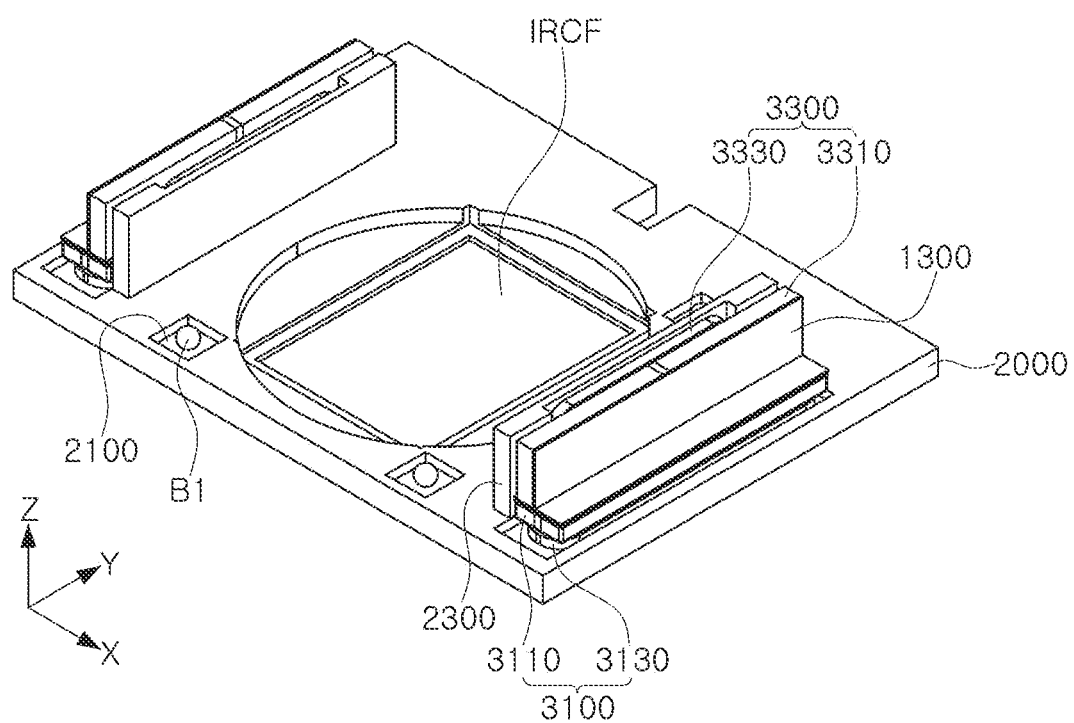
FIG. 6 is a perspective view illustrating a state in which a first driving unit of the first actuator of FIG. 4 is disposed on a movable frame of the first actuator of FIG. 4.
Figure 7:
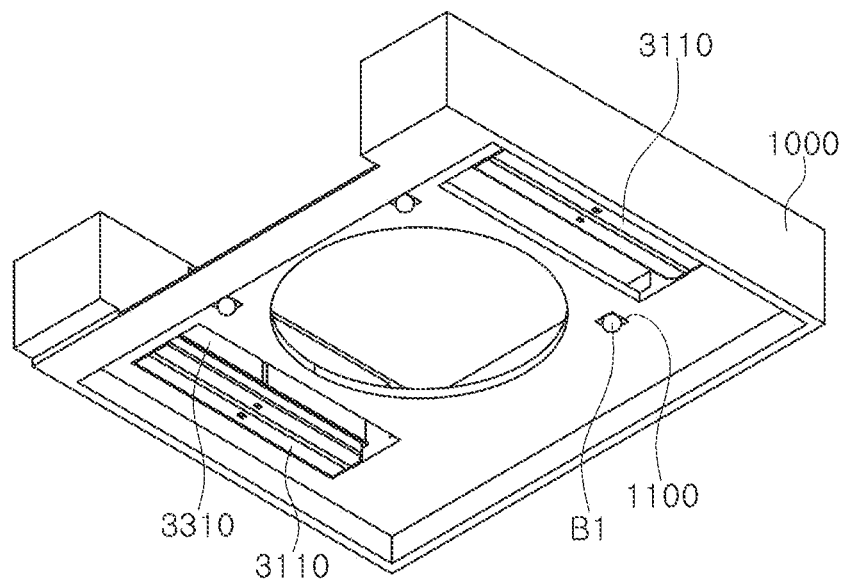
FIG. 7 is a bottom perspective view illustrating a state in which a first magnet and a second magnet of the first driving unit of the first actuator of FIG. 4 are disposed on a fixed frame of the first actuator of FIG. 4.

In addition, FIG. 6 is a perspective view illustrating a state in which a first driving unit of the first actuator of FIG. 4 is disposed on a movable frame of the first actuator of the first actuator of FIG. 4, and FIG. 7 is a bottom perspective view illustrating a state in which a first magnet and a second magnet of the first driving unit of the first actuator of FIG. 4 are disposed on a fixed frame of the first actuator of FIG. 4.

Figure 8:
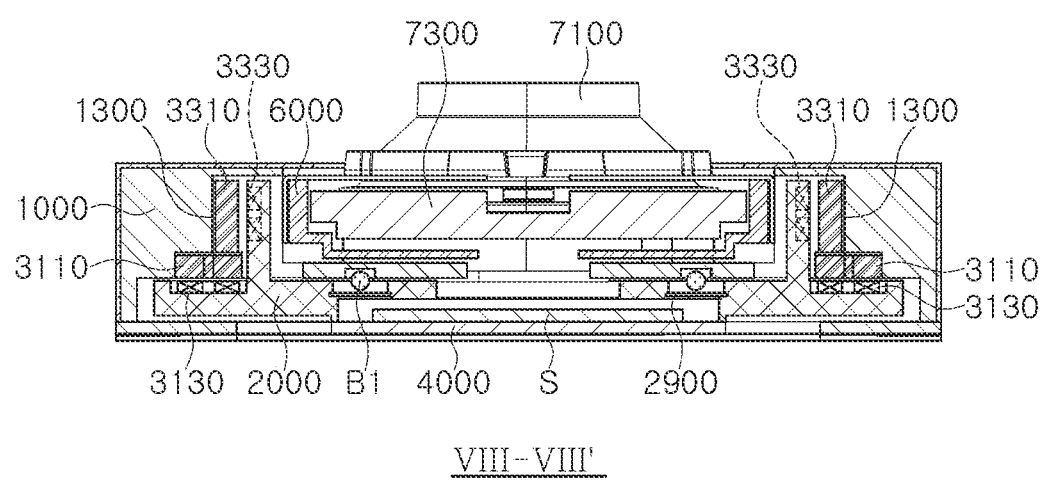
FIG. 8 is a cross-sectional view of the camera module of FIGS. 1 to 3 taken along the line VIII-VIII' of FIG. 1.

Also, FIG. 8 is a cross-sectional view of the camera module of FIGS. 1 to 3 taken along the line VIII-VIII' of FIG. 1.

Referring to FIGS. 3 to 8, the first actuator 10 may include a fixed frame 1000, a movable frame 2000, a sensor substrate 4000, and a base 5000.

The fixed frame 1000 is coupled to the second actuator 20 to be described below. For example, the fixed frame 1000 may be coupled to a housing 6000 (see FIGS. 11-14) of the second actuator 20.

The fixed frame 1000 is a fixed member that does not move during focus adjustment (i.e., autofocusing (AF)) and OIS.

The movable frame 2000 is disposed below the fixed frame 1000. Also, the movable frame 2000 is disposed to be relatively movable with respect to the fixed frame 1000. For example, the movable frame 2000 may be accommodated in the fixed frame 1000 and may move relative to the fixed frame 1000.

The fixed frame 1000 may have a side wall extending downwards in the optical axis (the Z-axis) direction, and thus the fixed frame 1000 may have an accommodation space for accommodating the movable frame 2000.

The movable frame 2000 may be moved relative to the fixed frame 1000 in a direction perpendicular to the optical axis (the Z-axis), or rotated around the optical axis (the Z-axis) as a rotation axis. That is, the movable frame 2000 is a moving member that moves during OIS.

For example, the movable frame 2000 is configured to be movable in the first axis (the X-axis) direction and the second axis (the Y-axis) direction, and may be rotated around the optical axis (the Z-axis) as a rotation axis.

The first axis (the X-axis) direction may refer to a direction perpendicular to the optical axis (the Z-axis), and the second axis (the Y-axis) direction may refer to a direction perpendicular to both the optical axis (the Z-axis) direction and the first axis (the X-axis) direction.

The movable frame 2000 may have a square plate shape having an opening penetrating through a center of the movable frame 2000 in the optical axis (the Z-axis) direction.

An infrared cut-off filter (IRCF) may be mounted on an upper surface of the movable frame 2000. The sensor substrate 4000 may be mounted on a lower surface of the movable frame 2000.

A first ball assembly B1 is disposed between the fixed frame 1000 and the movable frame 2000.

The first ball assembly B1 is disposed to contact each of the fixed frame 1000 and the movable frame 2000.

When the first ball assembly B1 is moved or rotated relative to the fixed frame 1000, the first ball assembly B1 rolls between the fixed frame 1000 and the movable frame 2000 to support movement of the movable frame 2000.

A shield can 1700 may be coupled to the fixed frame 1000. The shield can 1700 may be a component coupled to the fixed frame 1000 to protect the internal components of the camera module 1. In addition, the shield can 1700 may serve to shield electromagnetic waves.

Referring to FIG. 3, the image sensor S is mounted on the sensor substrate 4000. A portion of the sensor substrate 4000 is coupled to the movable frame 2000. Also, another portion of the sensor substrate 4000 may be coupled to the fixed frame 1000. As another example, the other portion of the sensor substrate 4000 may also be coupled to the base 5000.

The image sensor S is mounted on a portion of the sensor substrate 4000 coupled to the movable frame 2000.

Since a portion of the sensor substrate 4000 is coupled to the movable frame 2000, as the movable frame 2000 is moved or rotated, that portion of the sensor substrate 4000 may also be moved or rotated together with the movable frame 2000.

Accordingly, the image sensor S may be moved or rotated on a plane perpendicular to the optical axis (the Z-axis) to compensate for shaking during image capture.

The first actuator 10 further includes a first driving unit 3000 that generates a driving force in a direction perpendicular to the optical axis (the Z-axis) to move the movable frame 2000 in the direction perpendicular to the optical axis (the Z-axis), or rotate the movable frame 2000 around the optical axis (the Z-axis) as a rotation axis.

The first driving unit 3000 includes a first sub-driving unit 3100 and a second sub-driving unit 3300. The first sub-driving unit 3100 may generate a driving force in the first axis (the X-axis) direction, and the second sub-driving unit 3300 may generate a driving force in the second axis (the Y-axis) direction.

A portion of the first sub-driving unit 3100 and a portion of the second sub-driving unit 3300 may overlap in the optical axis (the Z-axis) direction. For example, a portion of a first magnet 3110 of the first sub-driving unit 3100 and a portion of a second magnet 3310 of the second sub-driving unit 3300 may be disposed to overlap each other in the optical axis (the Z-axis) direction.

The first sub-driving unit 3100 includes a first magnet 3110 and a first coil 3130. The first magnet 3110 and the first coil 3130 may be disposed to face each other in the optical axis (the Z-axis) direction. The first magnet 3110 and the first coil 3130 may generate a driving force in a direction perpendicular to a direction in which the first magnet 3110 and the first coil 3130 face each other.

The first magnet 3110 is disposed on the fixed frame 1000. The first magnet 3110 may include a plurality of magnets. For example, the first magnet 311 may include two magnets spaced apart from each other in the direction in which the driving force is generated by the first magnet 3110 and the first coil 3130. The two magnets may be spaced apart from each other in the first axis (the X-axis) direction. Each of the two magnets may have a length extending in the second axis (the Y-axis) direction.

The fixed frame 1000 may have an accommodation space in which the first magnet 3110 is disposed. By disposing the first magnet 3110 in the accommodation space, it is possible to prevent the overall height of the first actuator 10 and the camera module 1 from increasing due to a thickness of the first magnet 3110.

One surface of the first magnet 3110 (e.g., a surface facing the first coil 3130) may be magnetized to have both an N pole and an S pole. For example, an N pole, a neutral region, and an S pole may be sequentially arranged on the surface of the first magnet 3110 facing the first coil 3130 in the first axis (the X-axis) direction.

The first coil 3130 is disposed to face the first magnet 3110. For example, the first coil 3130 may be disposed to face the first magnet 3110 in the optical axis (the Z-axis) direction.

The first coil 3130 has a hollow donut shape and has a length extending in the second axis (the Y-axis) direction. The first coil 3130 includes a number of coils corresponding to the number of magnets included in the first magnet 3110. For example, the first coil 3130 may include two coils spaced apart from each other in the direction (the first axis (the X-axis) direction) in which the driving force is generated by the first magnet 3110 and the first coil 3130, and each of the two coils of the first coil 3130 may be disposed to face a respective one of the two magnets of the first magnet 3110 in the optical axis (the Z-axis) direction.

The first coil 3130 may be disposed on an upper surface of the movable frame 2000. For example, a mounting recess 2500 in which the first coil 3130 is mounted may be formed in the upper surface of the movable frame 2000, and the first coil 3130 may be disposed in the mounting recess 2500.

During OIS, the first magnet 3110 is a fixed member fixed to the fixed frame 1000, and the first coil 3130 is a moving member mounted on the movable frame 2000 and moving together with the movable frame 2000.

When power is applied to the first coil 3130, the movable frame 2000 may be moved in the first axis (the X-axis) direction by an electromagnetic force generated between the first magnet 3110 and the first coil 3130.

The first magnet 3110 and the first coil 3130 may generate a driving force in a direction (e.g., the first axis (the X-axis) direction) perpendicular to a direction (the optical axis direction) in which the first magnet 3110 and the first coil 3130 face each other.

The second sub-driving unit 3300 includes a second magnet 3310 and a second coil 3330. The second magnet 3310 and the second coil 3330 may face each other in a direction perpendicular to the optical axis (the Z-axis). The second magnet 3310 and the second coil 3330 may generate a driving force in a direction perpendicular to the direction in which the second magnet 3310 and the second coil 3330 face each other.

The second magnet 3310 is disposed on the fixed frame 1000. The second magnet 3310 may include a plurality of magnets. For example, the second magnet 3310 may include two magnets spaced apart from each other in a direction perpendicular to the direction in which the driving force is generated by the second magnet 3310 and the second coil 3330. The two magnets may be spaced apart from each other in the first axis (the X-axis) direction. The two magnets may have a length extending in the second axis (the Y-axis) direction.

The first magnet 3110 and the second magnet 3310 may have shapes having lengths extending in the same direction. For example, the plurality of magnets of the first magnet 3110 and the plurality of magnets of the second magnet 3310 may be elongated in the same direction (e.g., the second axis (the Y-axis) direction).

The fixed frame 1000 may have an accommodation space in which the second magnet 3310 is disposed. By disposing the second magnet 3310 in the accommodation space, it is possible to prevent the overall height of the first actuator 10 and the camera module 1 from increasing due to a thickness of the second magnet 3310.

The second magnet 3310 may be magnetized so that one surface (e.g., a surface facing the second coil 3330) has both an N pole and an S pole. For example, an N pole, a neutral region, and an S pole may be sequentially arranged on the surface of the second magnet 3310 facing the second coil 3330 in the second axis (the Y-axis) direction.

The second coil 3330 is disposed to face the second magnet 3310. For example, the second coil 3330 may be disposed to face the second magnet 3310 in a direction perpendicular to the optical axis (the Z-axis). For example, the second coil 3330 and the second magnet 3310 may be disposed to face each other in the first axis (the X-axis) direction.

The second coil 3330 has a hollow doughnut shape and has a length extending in the second axis (the Y-axis) direction. The second coil 3330 includes a number of coils corresponding to the number of magnets included in the second magnet 3310. For example, the second coil 3330 may include two coils spaced apart from each other in a direction (the first axis (the X-axis) direction) perpendicular to the direction (the second axis (the Y-axis) direction) in which the driving force is generated by the second magnet 3310 and the second coil 3330, and each of the two coils of the second coil 3330 may be disposed to face a respective one of the two magnets of the second magnet 3310 in the first axis (X-axis) direction.

The movable frame 2000 may have a support wall 2300 protruding in the optical axis (the Z-axis) direction. Also, the second coil 3330 may be disposed on the support wall 2300. For example, a mounting recess 2500 in which the second coil 3330 is mounted may be formed in the support wall 2300 of the movable frame 1000, and the second coil 3330 may be disposed in the mounting recess 2500.

During OIS, the second magnet 3310 is a fixed member fixed to the fixed frame 1000, and the second coil 3330 is a moving member mounted on the movable frame 2000 and moving together with the movable frame 2000.

When power is applied to the second coil 3330, the movable frame 2000 may be moved in the second axis (the Y-axis) direction by an electromagnetic force generated between the second magnet 3310 and the second coil 3330.

The second magnet 3310 and the second coil 3330 may generate a driving force in a direction (e.g., the second axis (the Y-axis) direction) perpendicular to a direction (the first axis (the X-axis) direction) in which the second magnet 3310 and the second coil 3330 face each other.

The movable frame 2000 may be rotated by the first sub-driving unit 3100 and the second sub-driving unit 3300.

For example, a rotational force may be generated by controlling a driving force generated by the first sub-driving unit 3100 and a driving force generated by the second sub-driving unit 3300, and accordingly the movable frame 2000 may be rotated.

A support yoke 1300 may be disposed between the first magnet 3110 and the second magnet 3310 and the fixed frame 1000. The support yoke 1300 may be made of a magnetic material, and a driving force may be improved by preventing magnetic flux of the first magnet 3110 and the second magnet 3310 from leaking.

The first magnet 3110 and the second magnet 3310 may be fixed to the support yoke 1300, and the support yoke 1300 may be fixed to the fixed frame 1000.

The first ball assembly B1 is disposed between the fixed frame 1000 and the movable frame 2000.

The first ball assembly B1 is disposed to contact each of the fixed frame 1000 and the movable frame 2000.

The first ball assembly B1 functions to guide a movement of the movable frame 2000 in the OIS process. In addition, the first ball assembly B1 also functions to maintain a spacing between the fixed frame 1000 and the movable frame 2000.

The first ball assembly B1 rolls in the first axis (the X-axis) direction when a driving force is generated in the first axis (the X-axis) direction. Accordingly, the first ball assembly B1 guides the movement of the movable frame 2000 in the first axis (the X-axis) direction.

In addition, the first ball assembly B1 rolls in the second axis (the Y-axis) direction when a driving force is generated in the second axis (the Y-axis) direction. Accordingly, the first ball assembly B1 guides the movement of the movable frame 2000 in the second axis (the Y-axis) direction.

The first ball assembly B1 includes a plurality of balls disposed between the fixed frame 1000 and the movable frame 2000.

Either one or both of the surfaces of the fixed frame 1000 and the movable frame 2000 facing each other in the optical axis (the Z-axis) direction is provided with a guide recess in which the first ball assembly B1 is disposed. A plurality of guide recesses corresponding to the plurality of balls of the first ball assembly B1 are provided.

For example, a first guide recess 1100 may be provided on a lower surface of the fixed frame 1000, and a second guide recess 2100 may be provided on an upper surface of the movable frame 2000.

The first ball assembly B1 is disposed in the first guide recess 1100 and the second guide recess 2100 and is inserted between the fixed frame 1000 and the movable frame 2000.

Each of the first guide recess 1100 and the second guide recess 2100 may have a polygonal or circular planar shape. A size of the first guide recess 1100 and the second guide recess 2100 is greater than a diameter of the first ball assembly B1. For example, a cross-section of the first guide recess 1100 and the second guide recess 2100 on a plane perpendicular to the optical axis (the Z-axis) may have a size larger than the diameter of the first ball assembly B1.

A specific shape of the first guide recess 1100 and the second guide recess 2100 is not limited as long as the size of the first guide recess 1100 and the second guide recess 2100 is greater than the diameter of the first ball assembly B1.

Accordingly, the first ball assembly B1 may roll in a direction perpendicular to the optical axis (the Z-axis), while being accommodated in the first guide recess 1100 and the second guide recess 2100.

Support pads may be provided in the fixed frame 1000 and the movable frame 2000, and at least a portion of the support pads may form bottom surfaces of the first guide recess 1100 and the second guide recess 2100. Accordingly, the first ball assembly B1 may roll in contact with the support pads.

The support pads may be integrated with the fixed frame 1000 and the movable frame 2000 by insert injection molding. In this case, the support pads may be manufactured to be integrated with the fixed frame 1000 and the movable frame 2000 by injecting a resin material into a mold while the support pads are fixed in the mold to form the fixed frame 1000 and the movable frame 2000.

The support pads may be made of a non-magnetic metal (e.g., stainless steel) material.

When a driving force is generated in the first axis (the X-axis) direction, the movable frame 2000 is moved in the first axis (the X-axis) direction.

In addition, when a driving force is generated in the second axis (the Y-axis) direction, the movable frame 2000 is moved in the second axis (the Y-axis) direction.

In addition, the movable frame 2000 may be rotated by generating a deviation between the driving force generated in the first axis (the X-axis) direction and the driving force generated in the second axis (the Y-axis) direction.

Since a portion of the sensor substrate 4000 is coupled to the movable frame 2000 and the image sensor S is disposed on the portion of the sensor substrate 4000 that is coupled to the movable frame 2000, as the movable frame 2000 is moved or rotated, the image sensor S may also be moved or rotated.

The first actuator 10 may detect a position of the movable frame 2000 in a direction perpendicular to the optical axis (the Z-axis).

To this end, a first position sensor 3150 and a second position sensor 3350 are provided. The first position sensor 3150 is disposed on the movable frame 2000 to face the first magnet 3110, and the second position sensor 3350 is disposed on the movable frame 2000 to face the second magnet 3310. The first position sensor 3150 and the second position sensor 3350 may be Hall sensors.

Either one or both of the first position sensor 3150 and the second position sensor 3350 may include two Hall sensors. The two Hall sensors may be disposed to face one magnet. For example, referring to FIG. 5, the first position sensor 3150 may include two Hall sensors, and the two Hall sensors may be disposed to face either one of the two magnets included in the first magnet 3110.

Figure 5:
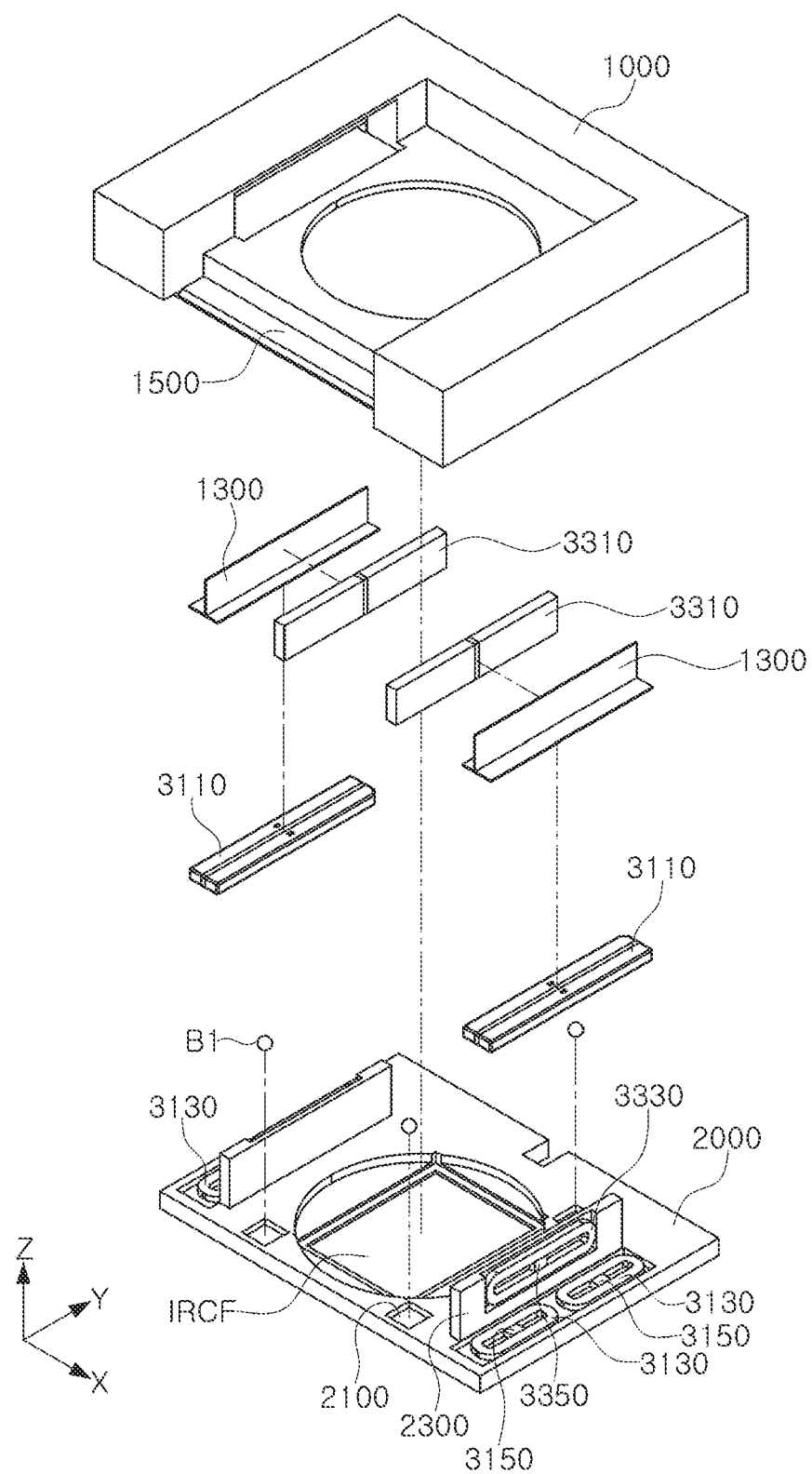
FIG. 5 is a modified example of the first actuator of FIG. 4.

In addition, referring to FIG. 5, either one of the two coils included in the first coil 3130 may itself include two coils spaced apart from each other in the second axis (the Y-axis) direction and facing one of the two magnets of the first magnet 3110, and the two Hall sensors of the first position sensor 3150 may be disposed inside the two coils spaced apart from each other in the second axis (the Y-axis) direction and face the one of the two magnets of the first magnet 3110.

It is possible to detect whether the movable frame 2000 is rotated through the two Hall sensors. Therefore, the movable frame 2000 may be intentionally rotated or, if rotation is not required, an unintentional rotational force applied to the movable frame 2000 may be offset.

Since a planar shape of the first guide recess 1100 and the second guide recess 2100 is a polygonal or circular shape that is larger than the diameter of the first ball assembly B1, the first ball assembly B1 disposed between the first guide recess 1100 and the second guide recess 2100 may roll without restriction in a direction perpendicular to the optical axis (the Z-axis).

Accordingly, the movable frame 2000 may be rotated around the Z-axis while being supported by the first ball assembly B1.

In addition, when rotation is not required and linear movement is required, an unintentionally generated rotational force may be canceled out by controlling a driving force of the first sub-driving unit 3100 and/or a driving force of the second sub-driving unit 3300.

Figure 9:
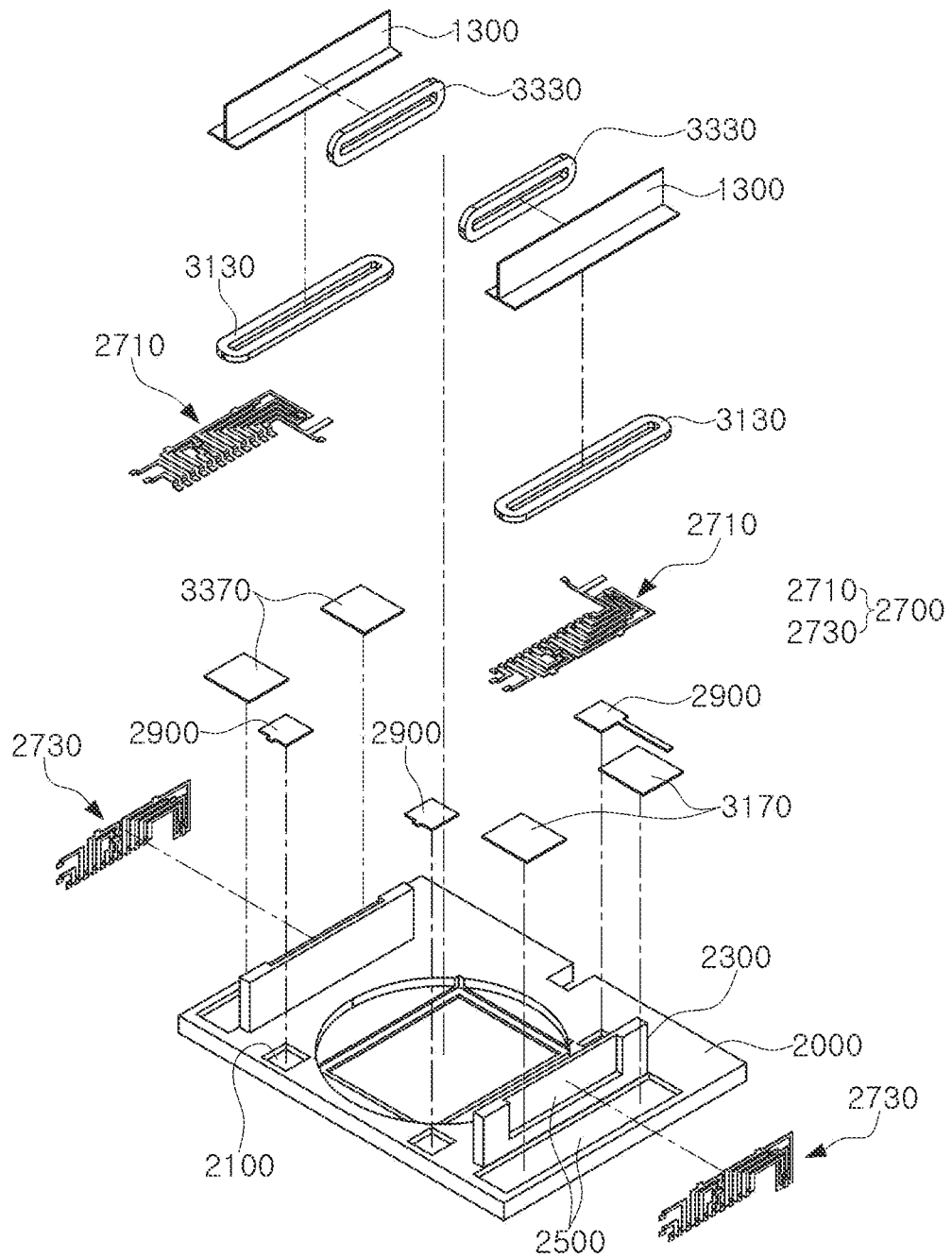
FIG. 9 is an exploded perspective view of the movable frame of the first actuator of FIG. 4.

FIG. 9 is an exploded perspective view of the movable frame of the first actuator of FIG. 4.

Referring to FIG. 9, the first coil 3130 and the second coil 3330 are disposed in the movable frame 2000, and a wiring pattern assembly 2700 is disposed inside the movable frame 2000. The wiring pattern assembly 2700 may be electrically connected to the first coil 3130 and the second coil 3330. Also, the wiring pattern assembly 2700 may be electrically connected to the sensor substrate 4000. Accordingly, the first coil 3130 and the second coil 3330 may receive power through the wiring pattern assembly 2700 disposed in the movable frame 2000.

That is, instead of disposing a separate printed circuit board (PCB) for supplying power to the first driving unit 3000 on the movable frame 2000, the movable frame 2000 itself is provided with the wiring pattern assembly 2700 to supply power to the first driving unit 3000.

Of course, it is also possible to dispose a printed circuit board on the movable frame 2000 and supply power to the first driving unit 3000 through the printed circuit board.

The wiring pattern assembly 2700 may be integrated with the movable frame 2000 by insert injection molding. For example, the wiring pattern assembly 2700 may be manufactured to be integrated with the movable frame 2000 by injecting a resin material into a mold while the wiring pattern assembly 2700 is disposed in the mold to form the movable frame 2000.

The wiring pattern assembly 2700 includes a first wiring pattern 2710 connected to the first coil 3130 and a second wiring pattern 2730 connected to the second coil 3330.

One end of the first wiring pattern 2710 is connected to the first coil 3130 and the other end of the first wiring pattern 2710 is connected to the sensor substrate 4000. Also, one end of the second wiring pattern 2730 is connected to the second coil 3330 and the other end of the second wiring pattern 2730 is connected to the sensor substrate 4000.

One end of the first wiring pattern 2710 and one end of the second wiring pattern 2730 are exposed to the outside of the movable frame 2000, and the exposed portions may be connected to the first coil 3130 and the second coil 3330.

Also, the other end of the first wiring pattern 2710 and the other end of the second wiring pattern 2730 may also be exposed to the outside of the movable frame 2000, and the exposed portions may be connected to the sensor substrate 4000.

Since the first wiring pattern 2710 and the second wiring pattern 2730 are connected to the sensor substrate 4000, power may be applied to the first coil 3130 and the second coil 3330 through the wiring pattern assembly 2700.

The first position sensor 3150 and the second position sensor 3350 are also mounted on the movable frame 2000 and are connected to the wiring pattern assembly 2700.

The movable frame 2000 includes a second guide recess 2100 in which the first ball assembly B1 is disposed. Since a material of the first ball assembly B1 may be a ceramic material and a material of the movable frame 2000 is plastic, the second guide recess 2100 may be damaged due to a difference between the hardness of the ceramic material and the hardness of the plastic.

Therefore, in order to prevent damage to the second guide recess 2100, a support pad 2900 is disposed in the second guide recess 2100. The support pad 2900 may be integrated with the frame 2000 together with the wiring pattern assembly 2700 by insert injection molding.

The support pad 2900 may be disposed inside the movable frame 2000, and one surface of the support pad 2900 may be exposed to the outside of the movable frame 2000 to contact the first ball assembly B1.

The support pad 2900 may be made of a non-magnetic metal (e.g., stainless steel) material.

The support pad 2900 may form a bottom surface of the second guide recess 2100. Accordingly, the first ball assembly B1 may roll in contact with the support pad 2900.

A first yoke 3170 and a second yoke 3370 are disposed inside the movable frame 2000. The first yoke 3170 and the second yoke 3370 generate an attractive force with the first magnet 3110 so that the fixed frame 1000 and the movable frame 2000 may be maintained in contact with the first ball assembly B1.

The first yoke 3170 and the second yoke 3370 may be integrated with the movable frame 2000 by insert injection molding, like the wiring pattern assembly 2700 and the support pad 2900.

The first yoke 3170 and the second yoke 3370 are disposed to face the first magnet 3110 in the optical axis (the Z-axis) direction.

The first yoke 3170 may include two yokes facing one of the two magnets of the first magnet 3110, and the second yoke 3370 may include two yokes facing the other one of the two magnets of the first magnet 3110.

At least a portion of each of the first yoke 3170 and the second yoke 3370 may be disposed inside the movable frame 2000.

An attractive force acts between the first yoke 3170 and the one magnet of the first magnet 3110 and between the second yoke 3370 and the other one of the first magnet 3110 in the optical axis (the Z-axis) direction.

Therefore, the movable frame 2000 is pressed in a direction toward the fixed frame 1000 by the attractive force, he fixed frame 1000 and the movable frame 2000 may be maintained in contact with the first ball assembly B1.

The first yoke 3170 and the second yoke 3370 are made of a material capable of generating an attractive force with the first magnet 3110. For example, the first yoke 3170 and the second yoke 3370 are magnetic members.

A number of the first yoke 3170 and the second yoke 3370 is not particularly limited, but a center point of the action of the attractive force acting between the first magnet 3110 and the first yoke 3170 and the second yoke 3370 should be located within a support region defined by imaginary lines connecting together a plurality of balls included in the first ball assembly B1.

Figure 10:
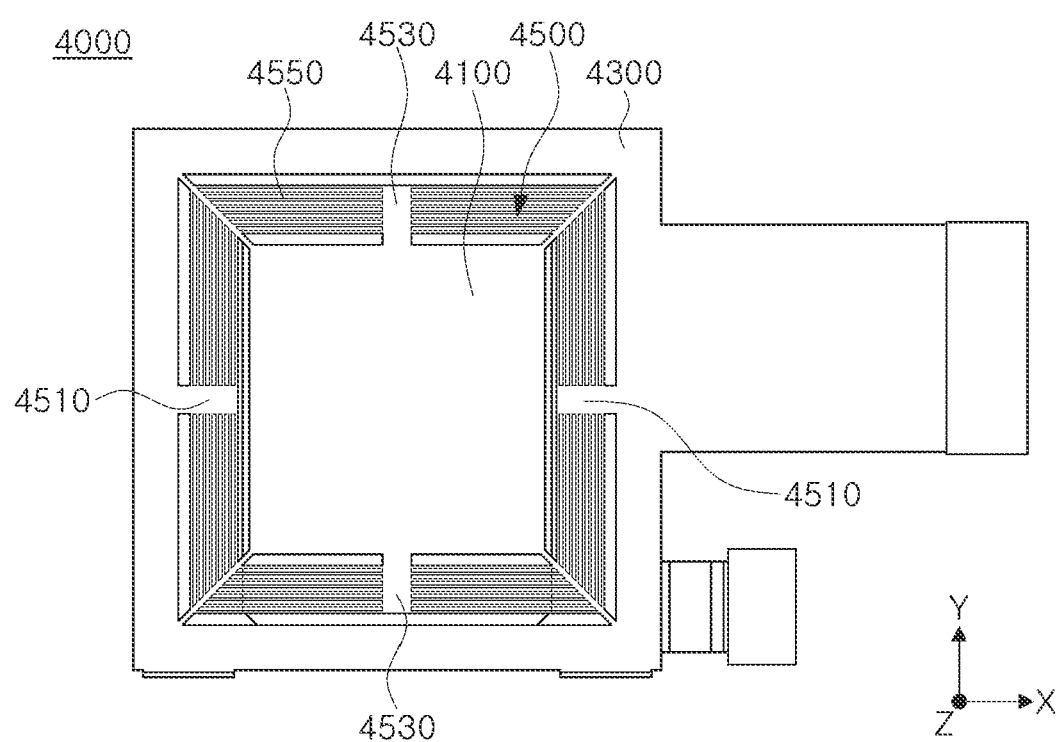
FIG. 10 is a plan view of a sensor substrate of the first actuator of FIG. 4.

FIG. 10 is a plan view of a sensor substrate of the first actuator of the first actuator of FIG. 4.

Referring to FIG. 10, the sensor substrate 4000 includes a moving portion 4100, a fixed portion 4300, and a connection portion 4500. The sensor substrate 4000 may be an RF PCB.

The image sensor S is mounted on the moving portion 4100. The moving portion 4100 is coupled to a lower surface of the movable frame 2000. For example, an area of the moving portion 4100 is larger than an area of the image sensor S, and a portion of the moving portion 4100 around the image sensor S may be coupled to the lower surface of the movable frame 2000.

The moving portion 4100 is a moving member moving together with the movable frame 2000 during OIS. The moving portion 4100 may be a rigid PCB.

The fixed portion 4300 may be coupled to a lower surface of the fixed frame 1000. The fixed portion 4300 is a fixed member that does not move during OIS. The fixed portion 4300 may be a rigid PCB.

The connection portion 4500 may be disposed between the moving portion 4100 and the fixed portion 4300, and may connect the moving portion 4100 to the fixed portion

4300. The connection portion 4500 may be a flexible PCB. When the moving portion 4100 is moved, the connection portion 4500 disposed between the moving portion 4100 and the fixed portion 4300 may be bent.

The connection portion 4500 extends along the circumference of the moving portion 4100. The connection portion 4500 is provided with a plurality of slits passing through the connection portion 4500 in the optical axis direction. The plurality of slits are disposed at intervals between the moving portion 4100 and the fixed portion 4300. Accordingly, the connection portion 4500 may include a plurality of bridge elements 4550 spaced apart from each other by the plurality of slits. The plurality of bridge elements 4550 extend along the circumference of the moving portion 4100. Each bridge element may have a width thinner than a thickness thereof.

The connection portion 4500 includes a first support portion 4510 and a second support portion 4530. The connection portion 4500 is connected to the fixed portion 4300 through the first support portion 4510. Also, the connection portion 4500 is connected to the moving portion 4100 through the second support portion 4530.

For example, the first support portion 4510 is in contact with and connected to the fixed portion 4300 and spaced apart from the moving portion 4100. Also, the second support portion 4530 is in contact with and connected to the moving portion 4100 and is spaced apart from the fixed portion 4300.

For example, the first support portion 4510 may extend in the first axis (the X-axis) direction to connect the plurality of bridge elements 4550 of the connection portion 4500 to the fixed portion 4300. In an embodiment, the first support portion 4510 may include two support portions disposed opposite to each other in the first axis (the X-axis) direction.

The second support portion 4530 may extend in the second axis (the Y-axis) direction to connect the plurality of bridge elements 4550 of the connection portion 4500 to the moving portion 4100. In an embodiment, the second support portion 4530 may include two support portions disposed opposite to each other in the second axis (the Y-axis) direction.

Accordingly, the moving portion 4100 may be moved in a direction perpendicular to the optical axis (the Z-axis), or rotated about the optical axis (the Z-axis), while being supported by the connection portion 4500.

In an embodiment, when the image sensor S is moved in the first axis (the X-axis) direction, the plurality of bridge elements 4550 connected to the first support portion 4510 may be bent. Also, when the image sensor S is moved in the second axis (the Y-axis) direction, the plurality of bridge elements 4550 connected to the second support portion 4530 may be bent. Also, when the image sensor S is rotated, the plurality of bridge elements 4550 connected to the first support portion 4510 and the plurality of bridge elements 4550 connected to the second support portion 4530 may be bent at the same time.

Referring to FIG. 3, the base 5000 may be coupled to a lower portion of the sensor substrate 4000.

The base 5000 may be coupled to the sensor substrate 4000 to cover the lower portion of the sensor substrate 4000. The base 5000 may serve to prevent external foreign substances from entering through a gap between the moving portion 4100 and the fixed portion 4300 of the sensor substrate 4000.

FIG. 11 is an exploded perspective view of a second actuator of the camera module of FIGS. 1 to 3, FIG. 12 is a side view of a carrier and a housing of the second actuator of FIG. 11, FIG. 13 is a cross-sectional view of the camera module of FIGS. 1 to 3 taken along the line XIII-XIII' of FIG. 1, and FIG. 14 is a cross-sectional view of the second actuator of FIG. 11 taken along the line XIV-XIV' of FIG. 3.

Referring to FIGS. 11 to 14, a second actuator 20 may include a lens module 7000, a housing 6000, a second driving unit 8000, and a case 6300.

The lens module 7000 may include a carrier 7300 coupled to a lens barrel 7100.

The carrier 7300 may include an opening penetrating the carrier 7300 in the optical axis (the Z-axis) direction, and the lens barrel 7100 is inserted into the hollow portion and fixedly disposed with respect to the carrier 7300. Accordingly, the lens barrel 7100 and the carrier 7300 may be moved together in the optical axis (the Z-axis) direction.

The housing 6000 may have an internal space and may have a quadrangular box shape with an open top and bottom. The carrier 7300 is disposed in the internal space of the housing 6000.

The case 6300 may be coupled to the housing 6000 to protect internal components of the second actuator 20.

The case 6300 may include a protrusion 6310 protruding toward a second ball assembly B2 to be described below. The protrusion 6310 may serve as a stopper and a buffer member regulating a movement range of the second ball assembly B2.

The second driving unit 8000 may generate a driving force in the optical axis (the Z-axis) direction to move the carrier 7300 in the optical axis (the Z-axis) direction.

The second driving unit 8000 includes a third magnet 8100 and a third coil 8300. The third magnet 8100 and the third coil 8300 may be disposed to face each other in a direction perpendicular to the optical axis (the Z-axis).

The third magnet 8100 is disposed on the carrier 7300. For example, the third magnet 8100 may be disposed on one side of the carrier 7300.

One side of the carrier 7300 may protrude relative to other portions thereof in the optical axis (the Z-axis) direction. For example, the carrier 7300 may include a first guide portion 7310 protruding in an optical axis (the Z-axis) direction, and the third magnet 8100 may be disposed on the first guide portion 7310.

By providing the first guide portion 7310 protruding in the optical axis (the Z-axis) direction, the size of the third magnet 8100 of the second driving unit 8000 may be increased to increase driving force generated by the second driving unit 8000, and a height of a second actuator 20 may be decreased by reducing a height of other portions of the carrier 7300.

A back yoke (not shown) may be disposed between the carrier 7300 and the third magnet 8100. The back yoke may improve a driving force by preventing leakage of magnetic flux of the third magnet 8100.

The third magnet 8100 may be magnetized so that one side (e.g., the side facing the third coil 8300) has both an N pole and an S pole. For example, an N pole, a neutral region, and an S pole may be sequentially arranged on one surface of the third magnet 8100 facing the third coil 8300 in the optical axis (the Z-axis) direction.

The third coil 8300 is disposed to face the third magnet 8100. For example, the third coil 8300 may be disposed to face the third magnet 8100 in a direction perpendicular to the optical axis (the Z-axis).

The third coil 8300 is disposed on a substrate 8900, and the substrate 8900 is mounted on the housing 6000 so that the third magnet 8100 and the third coil 8300 face each other in a direction perpendicular to the optical axis (the Z-axis). The substrate 8900 may be connected to the sensor substrate 4000.

One side of the housing 6000 may protrude relative to other portions of the housing in the optical axis (the Z-axis) direction. For example, the housing 6000 may include a second guide portion 6100 protruding in the optical axis (the Z-axis) direction, and the substrate 8900 may be mounted on the second guide portion 6100.

Figure 12:
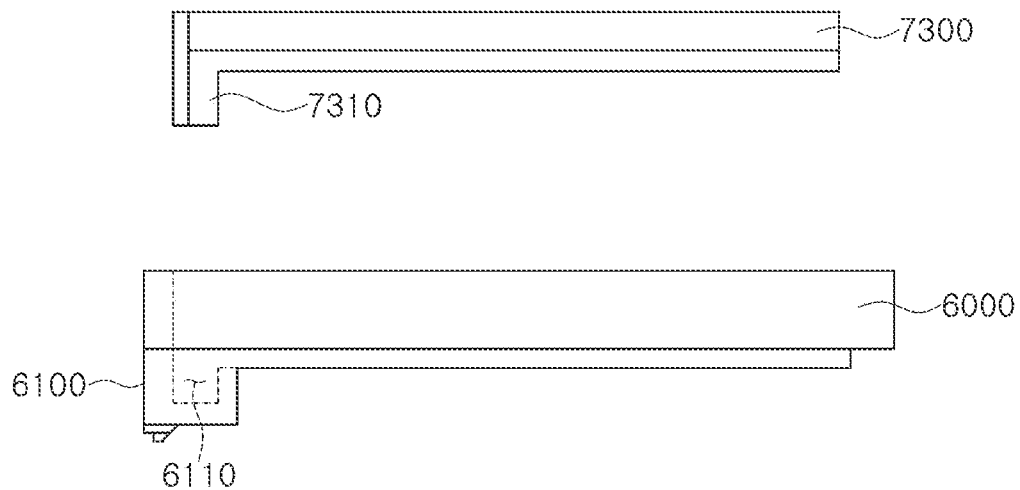
FIG. 12 is a side view of a carrier and a housing of the second actuator of FIG. 11.

Also, as illustrated in FIG. 12, the second guide portion 6100 has an accommodation space 6110 for accommodating the first guide portion 7310 and the third magnet 8100 of the second driving unit 8000 disposed thereon.

By providing the accommodation space 6110 for accommodating third magnet 8100 of the second driving unit 8000, the size of the third magnet 8100 may be increased to increase a driving force generated by the second driving unit 8000, and a height of the second actuator 20 may be decreased by reducing a height of the other portions of the housing 6000.

Since the first guide portion 7310 of the carrier 7300 and the second guide portion 6100 of the housing 6000 protrude in the optical axis (the Z-axis) direction, an installation space may be provided in the fixed frame 1000 of the first actuator 10 for the first guide portion 7310 and the second guide portion 6100.

That is, as illustrated in FIG. 3, a step portion 1500 may be provided on one side of the fixed frame 1000 to provide an installation space in which the first guide portion 7310 and the second guide portion 6100 are disposed.

That is, an installation space for the first guide portion 7310 and the second guide portion 6100 may be provided by the step portion 1500.

Therefore, in the second actuator 20, even if the first guide portion 7310 of the carrier 7300 and the second guide portion 6100 of the housing 6000 protrude in the optical axis (the Z-axis) direction, since the protruding portions are disposed in the first actuator 10, the height of the entire camera module 1 may not be increased.

The third magnet 8100 is a moving member mounted on the carrier 7300 and moving in the optical axis (the Z-axis) direction together with the carrier 7300, and the third coil 8300 is a fixed member fixed to the substrate 8900.

When power is applied to the third coil 8300, the carrier 7300 may be moved in the optical axis (the Z-axis) direction by an electromagnetic force generate between the third magnet 8100 and the third coil 8300.

Since the lens barrel 7100 is disposed in the carrier 7300, the lens barrel 7100 may also be moved in the optical axis (the Z-axis) direction by the movement of the carrier 7300.

A second ball assembly B2 is disposed between the carrier 7300 and the housing 6000. For example, the second ball assembly B2 may be disposed between the first guide portion 7310 of the carrier 7300 and the second guide portion 6100 of the housing 6000. The second ball assembly B2 includes a plurality of balls arranged in the optical axis (the Z-axis) direction. The plurality of balls may roll in the optical axis (the Z-axis) direction when the carrier 7300 is moved in the optical axis (the Z-axis) direction.

A yoke member 8700 is disposed in the housing 6000. The yoke member 8700 may be disposed facing the third magnet 8100. For example, the third coil 8300 may be disposed on one surface of the substrate 8900 and the yoke member 8700 may be disposed on the other surface of the substrate 8900.

The third magnet 8100 and the yoke member 8700 may generate an attractive force therebetween. For example, the attractive force acts between the third magnet 8100 and the yoke member 8700 in a direction perpendicular to the optical axis (the Z-axis).

The second ball assembly B2 may be held in contact with the carrier 7300 and the housing 6000 by attractive force generated between the third magnet 8100 and the yoke member 8700.

Guide recesses may be formed in surfaces of the carrier 7300 and the housing 6000 that face each other. For example, a third guide recess 7311 may be formed in the first guide portion 7310 of the carrier 7300, and a fourth guide recess 6111 may be formed in the second guide portion 6100 of the housing 6000.

The third guide recess 7311 and the fourth guide recess 6111 extend in the optical axis (the Z-axis) direction. The second ball assembly B2 is disposed between the third guide recess 7311 and the fourth guide recess 6111.

The third guide recess 7311 includes a first recess g1 and a second recess g2, and the fourth guide recess 6111 includes a third recess g3 and a fourth recess g4. Each of the first, second, third, and fourth recesses g1, g2, g3, and g4 has a length extending in the optical axis (the Z-axis) direction, and may have a V-shaped cross section when viewed in the optical axis (the Z-axis) direction. However, the cross section of the recesses is not limited to a V-shape.

The first recess g1 and the third recess g3 are disposed to face each other in a direction perpendicular to the optical axis (the Z-axis) direction, and a portion (e.g., a first ball group BG1 to be described below) of the plurality of balls of the second ball assembly B2 is disposed in a space between the first recess g1 and the third recess g3.

The first ball group BG1 includes a plurality of balls. Among the plurality of balls included in the first ball group BG1, the outermost balls in a direction parallel to the optical axis (the Z-axis) may be in two-point contact with each of the first recess g1 and the third recess g3.

That is, among the plurality of balls included in the first ball group BG1, the outermost balls in a direction parallel to the optical axis (the Z-axis) may be in two-point contact with the first recess g1, and may also be in two-point contact with the third recess g3.

The first ball group BG1, the first recess g1, and the third recess g3 may function as a main guide for guiding movement of the lens module 7000 in the optical axis (the Z-axis) direction.

The second recess g2 and the fourth recess g4 are disposed to face each other in a direction perpendicular to the optical axis (the Z-axis) direction, and a portion (e.g., a second ball group BG2 to be described below) is disposed in a space between the second recess g2 and the fourth recess g4.

The second ball group BG2 includes a plurality of balls. Among the plurality of balls included in the second ball group BG2, the outermost balls in a direction parallel to the optical axis (the Z-axis) may be in two-point contact with either one of the second recess g2 and the fourth recess g4, and may be in one-point contact with the other one of the second recess g2 and the fourth recess g4.

For example, among the plurality of balls included in the second ball group BG2, the outermost balls in a direction parallel to the optical axis (the Z-axis) may be in one-point contact with the second recess g2, and may be in two-point contact with the fourth recess g4. Alternatively, the outermost balls in the direction parallel to the optical axis (the Z-axis) may be in two-point contact with the second recess g2, and may be in one-point contact with the fourth recess g4. The second ball group BG2, the second recess g2, and the fourth recess g4 may function as an auxiliary guide for supporting movement of the lens module 7000 in the optical axis (the Z-axis) direction.

The second ball assembly B2 includes the first ball group BG1 and the second ball group BG2, and the first ball group BG1 and the second ball group BG2 each include a plurality of balls arranged in the optical axis (the Z-axis) direction.

The first ball group BG1 and the second ball group BG2 are spaced apart from each other in a direction (e.g., X-axis direction) perpendicular to the optical axis (the Z-axis). The number of balls in the first ball group BG1 and the number of balls in the second ball group BG2 may be different from each other.

For example, the first ball group BG1 includes two or more balls arranged in the optical axis (the Z-axis) direction, and the second ball group BG2 includes a fewer number of balls than the number of balls included in the first ball group BG1.

The number of balls included in each of the first and second ball groups BG1 and BG2 may be changed as long as the number of balls included in the first ball group BG1 and the number of balls included in the second ball group BG2 are different from each other. Hereinafter, for convenience of description, an embodiment in which the first ball group BG1 includes three balls and the second ball group BG2 includes two balls will be described.

Among the three balls included in the first ball group BG1, the two balls disposed at the outermost ends of the first ball group BG1 in a direction parallel to the optical axis (the Z-axis) have the same diameter as each other, and the one ball disposed therebetween may have a diameter smaller than the diameter of the balls disposed at the outermost ends of the first ball group BG1.

For example, among the plurality of balls included in the first ball group BG1, the two balls disposed at the outermost ends of the first ball group BG1 in a direction parallel to the optical axis (the Z-axis) have a first diameter, and the one ball disposed therebetween has a second diameter, and the first diameter is larger than the second diameter.

The two balls included in the second ball group BG2 may have the same diameter. For example, two balls included in the second ball group BG2 have a third diameter.

Also, the first diameter and the third diameter may be equal. Here, the diameters being equal may mean not only that the diameters are physically equal, but that the diameters are equal when taking into account manufacturing errors.

A distance between the centers of the outermost balls in the first ball group BG1 in a direction parallel to the optical axis (the Z-axis) is different from a distance between the centers of the outermost balls in the second ball group BG1 in the direction parallel to the optical axis (the Z-axis).

For example, the distance between the centers of the two balls in the first ball group BG1 having the first diameter is greater than a distance between the centers of the two balls in the second ball group BG2 having the third diameter.

When the carrier 7300 is moved in the optical axis (the Z-axis) direction, a center point CP of the action of the attractive force generated between the third magnet 8100 and the third yoke member 8700 should be located in a support region A defined by imaginary lines connecting contact points between the second ball assembly B2 and the carrier 7300 (or the housing 6000) so that the carrier 7300 may be moved to be parallel to the optical axis (the Z-axis) direction (that is, to prevent the carrier 7300 from tilting).

If the center point CP of the action of the attractive force deviates from the support region A, the orientation of the carrier 7300 may change when the carrier 7300 moves, which may cause the carrier 7300 to tilt. Therefore, it is necessary to make the support region A as wide as possible.

In an embodiment in the present disclosure, a size (e.g., a diameter) of a portion of the plurality of balls of the first ball assembly B1 is smaller than a size (e.g., a diameter) of the other balls on purpose. In this case, the larger balls among the plurality of balls of the second ball assembly B2 may be intentionally brought into contact with the carrier 7300 and the housing 6000.

Since the diameter of the two outermost balls of the first ball group BG1 is larger than the diameter of the remaining one ball of the first ball group BG1, the two outermost balls of the first ball group BG1 contact with the carrier 7300 and the housing 6000. Also, since the two balls of the second ball group BG2 have the same diameter as the two outermost balls of the first ball group BG1, the two balls of the second ball group BG2 contact the carrier 7300 and the housing 6000.

Accordingly, as illustrated in FIG. 14, when viewed in the second axis (the Y-axis) direction, the second ball assembly B2 is in four-point contact with the carrier 7300 or the housing 6000. Therefore, the support region A defined by the imaginary lines connecting the contact points to each other may have a quadrangular shape (e.g., a trapezoidal shape).

Therefore, the support region A may be made relatively wide, and accordingly the center point CP of the action of the attractive force generated between the third magnet 8100 and the third yoke member 8700 may be stably located in the support region A. Therefore, a driving stability during AF may be ensured.

Even if the two balls of the second ball group BG2 are manufactured to have the same diameter, the two balls of the second ball group BG2 may not physically have exactly the same diameter due to manufacturing errors. In this case, only one of the two balls of the second ball group BG2 may contact the carrier 7300 and the housing 6000.

Accordingly, the support region A formed by connecting contact points at which the second ball assembly B2 contacts the carrier 7300 (or the housing 6000) may have a triangular shape, rather than a triangular shape as shown in FIG. 14.

Even if the support region A has a triangular shape, the support region A may be made wide by the two outermost balls of the first ball group BG1 in a direction parallel to the optical axis (the Z-axis), and thus driving stability during AF may be ensured.

Apart from ensuring driving stability during AF, it is also an important issue to reduce the height of the camera module 1 in the optical axis (the Z-axis) direction (i.e. slimming the camera module 1). When the height of the camera module 1 in the Z-axis direction is simply reduced, the height of the support region A in the optical axis (the Z-axis) direction may also be reduced.

That is, simply reducing the height of the camera module 1 in the optical axis (the Z-axis) direction may cause a problem in driving stability during AF.

In an embodiment in the present disclosure, an auxiliary yoke 8710 may be disposed at a position facing the third magnet 8100. For example, the auxiliary yoke 8710 may be disposed on the substrate 8900 to face the third magnet 8100.

The auxiliary yoke 8710 may be located closer to the main guide than to the auxiliary guide. The auxiliary yoke 8710 is made of a material capable of generating an attractive force with the third magnet 8100.

Therefore, the resultant force of an attractive force generated between the third magnet 8100 and the third yoke member 8700 and the attractive force generated between the third magnet 8100 and the auxiliary yoke 8710 may be located closer to the main guide than to the auxiliary guide.

In another embodiment, the third magnet 8100 may be disposed eccentrically to the side of the carrier 7300 on which the third magnet 8100 is mounted in a longitudinal direction (e.g., the first axis (the X-axis) direction) of the third magnet 8100.

That is, the center of the side of the carrier 7300 on which the third magnet 8100 is mounted and the center of the third magnet 8100 may be misaligned. The direction in which the third magnet 8100 is eccentric may be toward the main guide.

That is, the third magnet 8100 may be disposed to be closer to the main guide than to the auxiliary guide.

Since a length of the support region A in the optical axis (the Z-axis) direction increases toward the main guide, the center point CP of the action of the attractive force may be more stably located in the support region A by placing the third magnet 8100 to be closer to the main guide.

In another embodiment, among the main guide and the auxiliary guide, the lengths of the first recess g1 and the third recess g3 of the main guide are longer than the lengths of the second recess g2 and the fourth recess g4 of the auxiliary guide, thereby increasing the size of the support region A.

That is, by forming the spaces in which each of the first and second ball groups BG1 and BG2 are accommodated to have different lengths in the optical axis (the Z-axis) direction, a change in the size of the support region A may be prevented or the center point CP of the action of the attractive force may not deviate from the support region A even if the size of the support region A is changed.

To this end, a first protrusion 6130 protruding toward the first ball group BG1 and a second protrusion 6150 protruding toward the second ball group BG2 may be formed in the housing 6000.

The first protrusion 6130 and the second protrusion 6150 may protrude from a bottom surface of the second guide portion 6100 of the housing 6000 in the optical axis (the Z-axis) direction. The first protrusion 6130 and the second protrusion 6150 have different lengths in the optical axis (the Z-axis) direction. For example, the length of the second protrusion 6150 in the optical axis (the Z-axis) direction may be longer than the length of the first protrusion 6130 in the optical axis (the Z-axis) direction.

Accordingly, the length of the second recess g2 and the length of the fourth recess g4 formed in the second guide portion 6100 of the housing 6000 in the optical axis (the Z-axis) direction are different from each other due to the first protrusion 6130 being longer than the second protrusion 6150. For example, the length of the second recess g2 in which the first ball group BG1 is disposed in the optical axis (the Z-axis) direction is longer than the length of the fourth recess g4 in which the second ball group BG2 is disposed in the optical axis (the Z-axis) direction.

The second actuator 20 may detect a position of the carrier 7300 in the optical axis (the Z-axis) direction.

To this end, a third position sensor 8500 is provided. The third position sensor 8500 is disposed on the substrate 8900 to face the third magnet 8100. The third position sensor 8500 may be a Hall sensor.

In the camera module 1 according to an embodiment in the present disclosure, the lens module 7000 is configured to move in the optical axis (the Z-axis) direction during AF, and the image sensor S is configured to move in a direction perpendicular to the optical axis (the Z-axis) during OIS.

Therefore, even if the lens module 7000 is moved in the optical axis (the Z-axis) direction during AF, the relative positions of the magnets and coils of the first driving unit 3000 do not change, so that the driving force for OIS may be precisely controlled.

In addition, even if the image sensor S is moved in a direction perpendicular to the optical axis, during OIS, the relative positions of the magnet and the coil of the second driving unit 8000 do not change, so that the driving force for AF may be precisely controlled.

During OIS, the movable frame 2000 is moved in the first axis (X-axis) direction by the driving force generated by the first sub-driving unit 3100. At this time, since the second magnet 3310 and the second coil 3330 of the second sub-driving unit 3300 face each other in the first axis (the X-axis) direction, when the movable frame 2000 moves in the first axis (the X-axis) direction, a distance between the second magnet 3310 and the second coil 3330 (a distance in the first axis (the X-axis) direction) may change.

The second magnet 3310 includes two magnets spaced apart from each other in the first axis (the X-axis) direction, and the second coil 3330 includes two coils spaced apart from each other in the first axis (the X-axis) direction.

Therefore, when the movable frame 2000 is moved in the first axis (the X-axis) direction, the distance between the magnet and the coil of one set of the second sub-driving unit 3300 narrows, while the distance between the magnet and the coil of the other set of the second sub-driving unit 3300 widens, so that an increase in the driving force generated by the magnet and the coil of the one set may be compensated by a decrease in the driving force generated by the magnet and the coil of the other set. Accordingly, the driving force generated by the second sub-driving unit 3300 may be maintained constant or substantially constant as the movable frame 2000 moves in the first axis (the X-axis) direction.

As discussed above, the actuator for optical image stabilization (OIS) and the camera module including the actuator for optical image stabilization (OIS) according to an embodiment in the present disclosure may improve OIS performance.

While this disclosure includes specific examples, it will be apparent after an understanding of the disclosure of this application that various changes in form and details may be made in these examples without departing from the spirit and scope of the claims and their equivalents. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator for optical image stabilization, the actuator comprising:
 a fixed frame having an internal space;
 a movable frame disposed in the internal space of the fixed frame and configured to be movable relative to the fixed frame;
 a first driving unit configured to apply a driving force to the movable frame; and a sensor substrate comprising a moving portion coupled to the movable frame,
wherein an image sensor is disposed on the moving portion of the sensor substrate,
the first driving unit comprises:
a first sub-driving unit comprising a first magnet disposed on the fixed frame and a first coil disposed to face the first magnet; and
a second sub-driving unit comprising a second magnet disposed on the fixed frame and a second coil disposed to face the second magnet, and
a portion of the first magnet overlaps a portion of the second magnet in a direction perpendicular to an imaging surface of the image sensor.

2. The actuator of claim 1, wherein a direction in which the first magnet and the first coil face each other and a direction in which the second magnet and the second coil face each other are perpendicular to each other.

3. The actuator of claim 2, wherein the first magnet and the first coil are configured to generate a driving force in a direction perpendicular to the direction in which the first magnet and the first coil face each other, and
the second magnet and the second coil are configured to generate a driving force in a direction perpendicular to the direction in which the second magnet and the second coil face each other.

4. The actuator of claim 3, wherein the first magnet and the first coil are disposed to face each other in the direction perpendicular to the imaging surface of the image sensor, and
the second magnet and the second coil are disposed to face each other in a direction parallel to the imaging surface of the image sensor.

5. The actuator of claim 2, wherein the first magnet comprises two magnets spaced apart from each other in a first axis direction parallel to the imaging surface of the image sensor,
the first coil comprises two coils spaced apart from each other in the first axis direction,
the second magnet comprises two magnets spaced apart from each other in the first axis direction, and
the second coil comprises two coils spaced apart from each other in the first axis direction.

6. The actuator of claim 1, further comprising a wiring pattern portion disposed inside the movable frame,
wherein the first coil and the second coil are electrically connected to the sensor substrate by the wiring pattern portion.

7. The actuator of claim 6, wherein the first coil and the second coil are disposed on the movable frame, and
the wiring pattern portion comprises:
a first wiring pattern having one end electrically connected to the first coil and another end electrically connected to the sensor substrate; and
a second wiring pattern having one end electrically connected to the second coil and another end electrically connected to the sensor substrate.

8. The actuator of claim 1, further comprising:
a first ball assembly disposed between the fixed frame and the movable frame;
a first yoke facing the first magnet and disposed inside the movable frame; and
a second yoke facing the second magnet and disposed inside the movable frame.

9. The actuator of claim 8, further comprising a support pad disposed inside the movable frame,
wherein one surface of the support pad is exposed to the outside of the movable frame and contacts the first ball assembly.

10. A camera module comprising:
a housing having an internal space;
a lens module disposed in the internal space of the housing and configured to be movable relative to the housing in an optical axis direction of the lens module;
a fixed frame disposed in the internal space of the housing and fixed relative to the housing;
a movable frame configured to be movable relative to the fixed frame in a direction perpendicular to the optical axis direction;
a first ball assembly disposed between the fixed frame and the movable frame;
a first driving unit comprising a first magnet and a second magnet disposed on the fixed frame, and a first coil and a second coil disposed on the movable frame; and
a sensor substrate comprising a moving portion coupled to the movable frame,
wherein an image sensor is disposed on the moving portion of the sensor substrate,
the first magnet and the first coil are configured to generate a driving force in a first axis direction perpendicular to the optical axis direction,
the second magnet and the second coil are configured to generate a driving force in a second axis direction perpendicular to both the optical axis direction and the first axis direction, and
both the first magnet and the second magnet are elongated in the first axis direction or the second axis direction.

11. The camera module of claim 10, wherein the first magnet and the first coil are disposed to face each other in the optical axis direction, and
the second magnet and the second coil are disposed to face each other in the first axis direction.

12. The camera module of claim 11, wherein the first magnet comprises two magnets spaced apart from each other in the first axis direction,
the first coil comprises two coils spaced apart from each other in the first axis direction,
the second magnet comprises two magnets spaced apart from each other in the first axis direction, and
the second coil comprises two coils spaced apart from each other in the first axis direction.

13. The camera module of claim 10, further comprising a wiring pattern portion disposed inside the movable frame,
wherein the first coil and the second coil are electrically connected to the sensor substrate by the wiring pattern portion.

14. The camera module of claim 10, further comprising a second ball assembly disposed between the housing and the lens module,
wherein the second ball assembly comprises a first ball group and a second ball group spaced apart from each other in the first axis direction, and
the first ball group comprises two or more balls disposed in the optical axis direction, and the second ball group comprises fewer balls than the first ball group.

15. The camera module of claim 10, wherein the lens module comprises a first guide portion protruding in the optical axis direction,
the housing comprises a second guide portion protruding in the optical axis direction and accommodating the first guide portion, and the camera module further comprises a second ball assembly disposed between the first guide portion and the second guide portion.

16. The camera module of claim 15, wherein the fixed frame comprises a step portion providing an accommodation space in which the second guide portion is disposed.

17. An actuator for optical image stabilization, the actuator comprising:

a fixed frame having an internal space;

a movable frame disposed in the internal space of the fixed frame and configured to be movable relative to the fixed frame;

a sensor substrate comprising a moving portion fixed to the movable frame, the moving portion comprising an image sensor mounting area;

a first sub-driving unit configured to apply a first sub-driving force to the movable frame to move the movable frame in a first axis direction perpendicular to an optical axis direction perpendicular to a surface of the image sensor mounting area; and a second sub-driving unit configured to apply a second sub-driving force to the movable frame to move the movable frame in a second axis direction perpendicular to the first axis direction and the optical axis direction and maintain the second sub-driving force substantially constant as the movable frame moves in the first axis direction.

18. The actuator of claim 17, wherein the first sub-driving unit comprises:

two magnets supported by the fixed frame and spaced apart from each other in the first axis direction; and two coils supported by the movable frame, spaced apart from each other in the first axis direction, and respectively facing the two magnets of the first sub-driving unit in the optical axis direction, and the second sub-driving unit comprises:

two magnets supported by the fixed frame and spaced apart from each other in the first axis direction; and two coils supported by the movable frame, spaced apart from each other in the first axis direction, and respectively facing the two magnets of the second sub-driving unit in the first axis direction.

19. The actuator of claim 18, further comprising two support yokes mounted on the fixed frame and spaced apart from each other in the first axis direction, wherein each of the two magnets of the first sub-driving unit is mounted on a surface of a respective one of the two support yokes facing in the optical axis direction, and each of the two magnets of the second sub-driving unit is mounted on a surface of a respective one of the two support yokes facing in the first axis direction.

20. The actuator of claim 17, wherein a portion of each of the two magnets of the first sub-driving unit overlaps a portion of a respective one of the two magnets of the second sub-driving unit in the optical axis direction, and the two magnets of the first sub-driving unit and the two magnets of the second sub-driving unit are elongated in the second axis direction.

* * * * *